US012743869B2

(12) United States Patent
Ishihara

(10) Patent No.: US 12,743,869 B2
(45) Date of Patent: Sep. 22, 2026

(54) CLASS BOUNDARY DETECTION APPARATUS, CONTROL METHOD, AND NON-TRANSITORY COMPUTER-READABLE MEDIUM

(71) Applicant: NEC Corporation, Tokyo (JP)

(72) Inventor: Kenta Ishihara, Tokyo (JP)

(73) Assignee: NEC CORPORATION, Tokyo (JP)

(*) Notice: Subject to any disclaimer, the term of this patent is extended or adjusted under 35 U.S.C. 154(b) by 239 days.

(21) Appl. No.: 18/698,046

(22) PCT Filed: Oct. 26, 2021

(86) PCT No.: PCT/JP2021/039405
§ 371 (c)(1),
(2) Date: Apr. 3, 2024

(87) PCT Pub. No.: WO2023/073795
PCT Pub. Date: May 4, 2023

(65) Prior Publication Data

US 2024/0404248 A1 Dec. 5, 2024

(51) Int. Cl.
*G06V 10/764* (2022.01)
*G06N 20/00* (2019.01)
(Continued)

(52) U.S. Cl.
CPC .............. *G06V 10/764* (2022.01); *G06T 7/70* (2017.01); *G06V 10/44* (2022.01); *G06V 10/761* (2022.01)

(58) Field of Classification Search
CPC .... G06V 10/764; G06V 10/44; G06V 10/761; G06V 20/41; G06V 20/46; G06T 7/70; G06N 20/00
See application file for complete search history.

(56) References Cited

U.S. PATENT DOCUMENTS

2006/0107216 A1* 5/2006 Cooper ............... G06F 16/7847 382/173
2008/0316307 A1 12/2008 Petersohn
(Continued)

FOREIGN PATENT DOCUMENTS

JP 2008-005167 A 1/2008
JP 2008-065265 B 3/2008
(Continued)

OTHER PUBLICATIONS

Japanese Office Communication for JP Application No. 2023-555920 mailed on Dec. 10, 2024 with English Translation.
(Continued)

*Primary Examiner* — Vu Le
*Assistant Examiner* — Jessica Yifang Lin
(74) *Attorney, Agent, or Firm* — Sughrue Mion, PLLC

(57) ABSTRACT

A class boundary detection apparatus (2000) acquires target time-series data (10). The class boundary detection apparatus (2000) extracts a plurality of pieces of extracted time-series data from the target time-series data (10), and calculates a similarity between each piece of extracted time-series data and reference time-series data (30). The reference time-series data (30) is time-series data representing a class boundary, and has a head portion of time-series data belonging to a subsequent class indicated by the class boundary after a tail portion of time-series data belonging to a preceding class indicated by the class boundary. The class boundary detection apparatus (2000) detects a class boundary represented by the reference time-series data (30) from extracted time-series data having the calculated similarity equal to or more than a threshold.

14 Claims, 17 Drawing Sheets

(51) Int. Cl.

| | |
|---|---|
| ***G06T 7/70*** | (2017.01) |
| ***G06V 10/44*** | (2022.01) |
| ***G06V 10/74*** | (2022.01) |

(56) References Cited

U.S. PATENT DOCUMENTS

| | | | | |
|---|---|---|---|---|
| 2014/0240602 | A1 | 8/2014 | Murahashi | |
| 2021/0349773 | A1* | 11/2021 | Gusat | G06F 11/079 |

FOREIGN PATENT DOCUMENTS

| | | | |
|---|---|---|---|
| JP | 2014-241457 | A | 12/2014 |
| JP | 2016-076073 | A | 5/2016 |
| JP | 2020-024277 | A | 2/2020 |
| JP | 2021-111401 | | 8/2021 |

OTHER PUBLICATIONS

International Search Report for PCT Application No. PCT/JP2021/039405, mailed on Jan. 18, 2022.

* cited by examiner

10

60-1

60-2

60-3

DETERMINE WHETHER OR NOT SIMILARITY WITH REFERENCE TIME-SERIES DATA 30 IS HIGH FOR EACH EXTRACTED TIME-SERIES DATA 60

30

BOUNDARY BETWEEN C1 AND C2

THIS IS DETECTED AS BOUNDARY BETWEEN C1 AND C2

100

80 90

| BOUNDARY TYPE IDENTIFICATION INFORMATION | REFERENCE DATA |
|---|---|
| (C1, C2) | F12 |
| (C1, C3) | F13 |
| (C2, C1) | F21 |
| . . . | . . . |

| BOUNDARY TYPE IDENTIFICATION INFORMATION | BOUNDARY POSITION |
|---|---|
| (C1, C2) | n1 |
| (C2, C3) | n2 |
| (C3, C4) | n3 |
| . . . | . . . |

CLASS BOUNDARY B3
(C1, C2)

CLASS BOUNDARY B4
(C3, C4)

130

B3

SIMILARITY BETWEEN FRAMES

FRAME NUMBER

140

B4

SIMILARITY BETWEEN FRAMES

FRAME NUMBER

IN RANGE OF CLASS C2, SIMILARITY BETWEEN EXTRACTED TIME-SERIES DATA 60 AND REFERENCE TIME-SERIES DATA 30 IS LOW

IN RANGE OF CLASS C3, SIMILARITY BETWEEN EXTRACTED TIME-SERIES DATA 60 AND REFERENCE TIME-SERIES DATA 30 IS HIGH

CLASS BOUNDARY B3 IS CORRECTED TO (C1, C3)

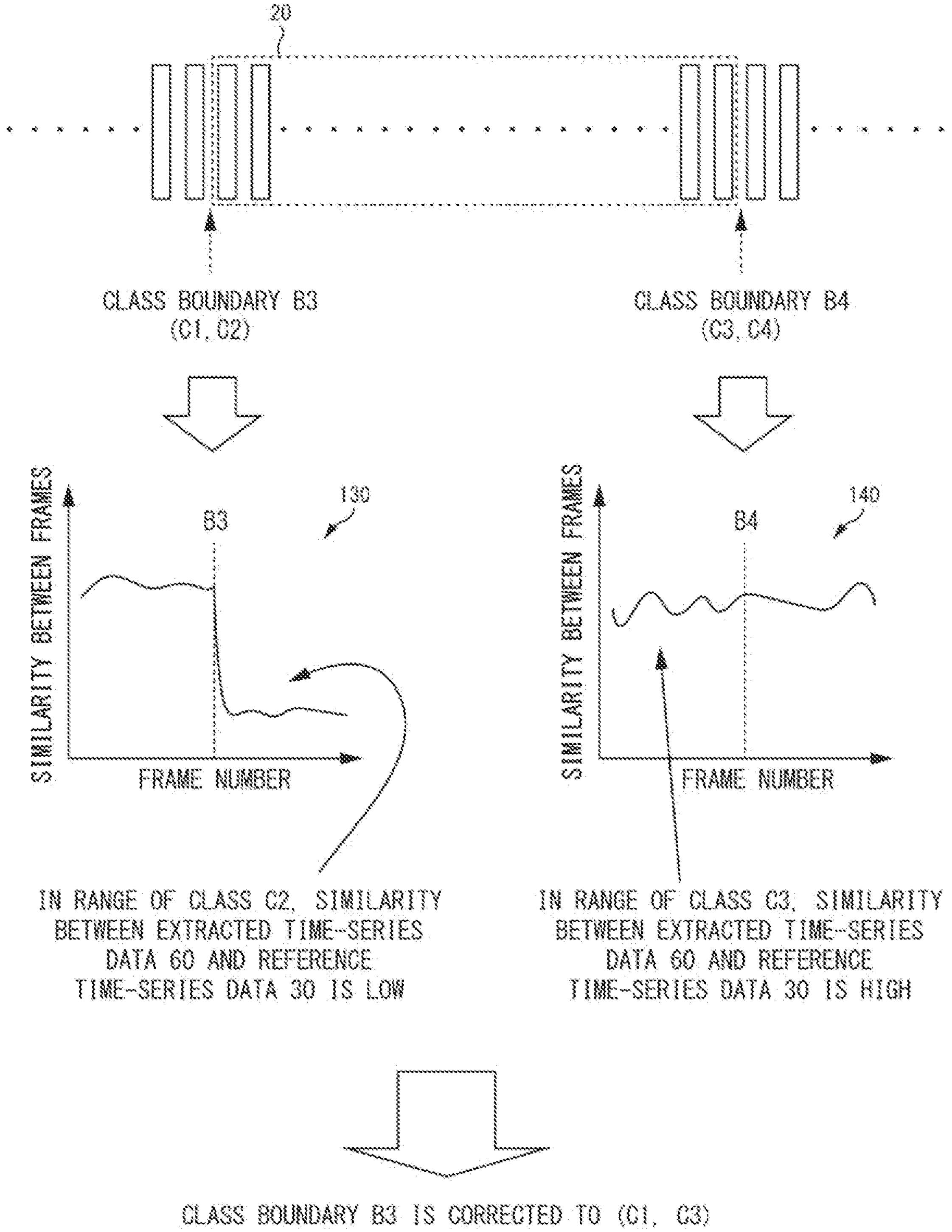

Fig. 16

CLASS BOUNDARY DETECTION APPARATUS, CONTROL METHOD, AND NON-TRANSITORY COMPUTER-READABLE MEDIUM

This application is a National Stage Entry of PCT/JP2021/039405 filed on Oct. 26, 2021, the contents of all of which are incorporated herein by reference, in their entirety.

TECHNICAL FIELD

The present disclosure relates to a technology for analyzing time-series data.

BACKGROUND ART

One piece of time-series data may include a plurality of pieces of time-series data belonging to any one of a plurality of classes. For example, it is assumed that the time-series data is video data obtained by capturing a scene in which a plurality of work processes is sequentially performed. In this case, the video data includes a plurality of video data representing each work process.

Patent Literature 1 discloses a technology of assigning a label of a class to which a frame belongs to each data (hereinafter, a frame) constituting time-series data. A data processing device of Patent Literature 1 extracts frames from time-series data at regular intervals. A label of a class is manually given to each extracted frame by the user. Further, the data processing device determines whether or not a difference between adjacent frames is equal to or less than a threshold for the plurality of extracted frames. In a case where the difference between adjacent frames is equal to or less than the threshold, the label given to these frames is automatically given to each frame existing between these frames. Meanwhile, when the difference between adjacent frames is not equal to or less than the threshold, a plurality of frames is extracted at finer intervals from between these frames, and similar processing is performed.

CITATION LIST

Patent Literature

Patent Literature 1: Japanese Unexamined Patent Application Publication No. 2016-076073

SUMMARY OF INVENTION

Technical Problem

In the invention of Patent Literature 1, it is necessary for a user to manually assign a class label to an extracted frame. The present invention has been made in view of this problem, and an object of the present invention is to provide a technology for detecting a class boundary from time-series data.

Solution to Problem

A class boundary detection apparatus according to the present disclosure includes an acquisition unit configured to acquire target time-series data that is time-series data to be analyzed, a calculation unit configured to extract a plurality of pieces of extracted time-series data from the target time-series data and calculate a similarity between reference time-series data representing class boundaries of two different classes and each piece of the extracted time-series data, and a detection unit configured to detect a class boundary represented by the reference time-series data from the extracted time-series data having the calculated similarity equal to or more than a threshold. The reference time-series data includes, after a tail portion of time-series data belonging to a preceding class indicated by the class boundary, a head portion of time-series data belonging to a subsequent class indicated by the class boundary.

A control method of the present disclosure is executed by a computer. The control method includes an acquisition step of acquiring target time-series data that is time-series data to be analyzed, a calculation step of extracting a plurality of pieces of extracted time-series data from the target time-series data and calculating a similarity between reference time-series data representing class boundaries of two different classes and each piece of the extracted time-series data, and a detection step of detecting a class boundary represented by the reference time-series data from the extracted time-series data having the calculated similarity equal to or more than a threshold. The reference time-series data includes, after a tail portion of time-series data belonging to a preceding class indicated by the class boundary, a head portion of time-series data belonging to a subsequent class indicated by the class boundary.

A non-transitory computer-readable medium of the present disclosure stores a program for causing a computer to execute the control method of the present disclosure.

Advantageous Effects of Invention

According to the present disclosure, there is provided a technology of detecting a boundary of a class from time-series data.

BRIEF DESCRIPTION OF DRAWINGS

FIG. 8 is a diagram illustrating reference data.

FIG. 11 is a diagram illustrating output information indicating a boundary type and a position of each class boundary.

FIG. 16 is a diagram illustrating a boundary type correction method.

EXAMPLE EMBODIMENT

Figure 1:
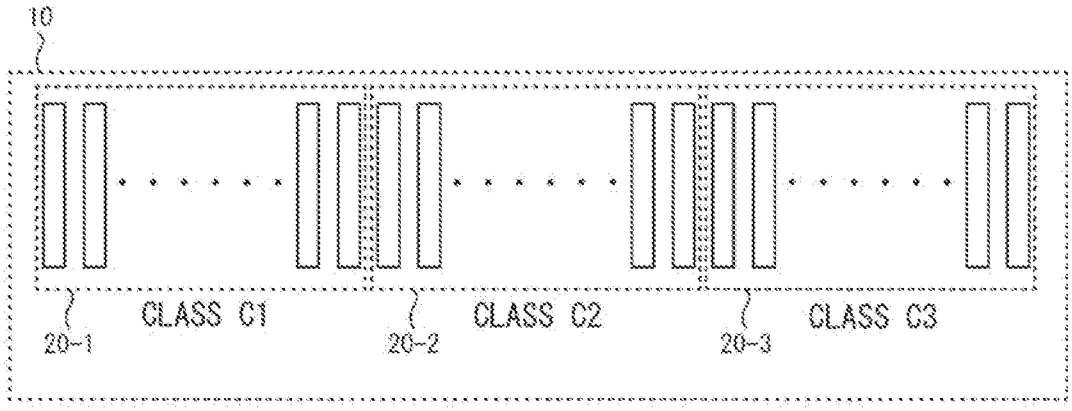
FIG. 1 is a diagram illustrating target time-series data handled by a class boundary detection apparatus according to an example embodiment.

Hereinafter, example embodiments of the present disclosure will be described in detail with reference to the drawings. In the drawings, the same or corresponding elements are denoted by the same reference numerals, and repeated description is omitted as necessary for clarity of description. In addition, unless otherwise described, predetermined values such as predetermined values and thresholds are stored in advance in a storage device or the like accessible from a device using the values. Furthermore, unless otherwise described, a storage unit includes one or more arbitrary number of storage devices.

<Overview>

FIG. 1 is a diagram illustrating target time-series data 10 handled by a class boundary detection apparatus according to an example embodiment. The target time-series data 10 includes a plurality of pieces of time-series data 20 belonging to different classes. For example, the target time-series data 10 in FIG. 1 includes time-series data 20-1 belonging to a class C1, time-series data 20-2 belonging to a class C2, and time-series data 20-3 belonging to a class C3 in this order. Hereinafter, each piece of data constituting the time-series data is referred to as a frame. The time-series data can be expressed as a sequence of data in which frames are arranged in time series.

A class boundary detection apparatus 2000 can handle various types of time-series data as the target time-series data 10. For example, the target time-series data 10 is video data. The video data is time-series data in which a plurality of video frames generated by a video camera are arranged in order of generation (ascending order of frame numbers). In a case where the target time-series data 10 is video data, for example, each time-series data 20 included in the target time-series data 10 is classified into a class according to the content of the video represented by the time-series data 20.

For example, it is assumed that a scene in which a worker is performing the work including three processes P1, P2, and P3 is captured by a video camera, and video data obtained by the capturing is treated as the target time-series data 10. In this case, each work process can be treated as a class. That is, the target time-series data 10 can be divided into three pieces of time-series data 20, that is, time-series data 20 including the work scene of the process P1, time-series data 20 including the work scene of the process P2, and time-series data 20 including the work scene of the process P3.

The target time-series data 10 is not limited to the video data. For example, the target time-series data 10 may be sound data generated by recording sound with a microphone. In addition, for example, the target time-series data 10 may be sensing data representing a result of sensing repeatedly performed by an arbitrary sensor (for example, a three-dimensional acceleration sensor).

Figure 2:
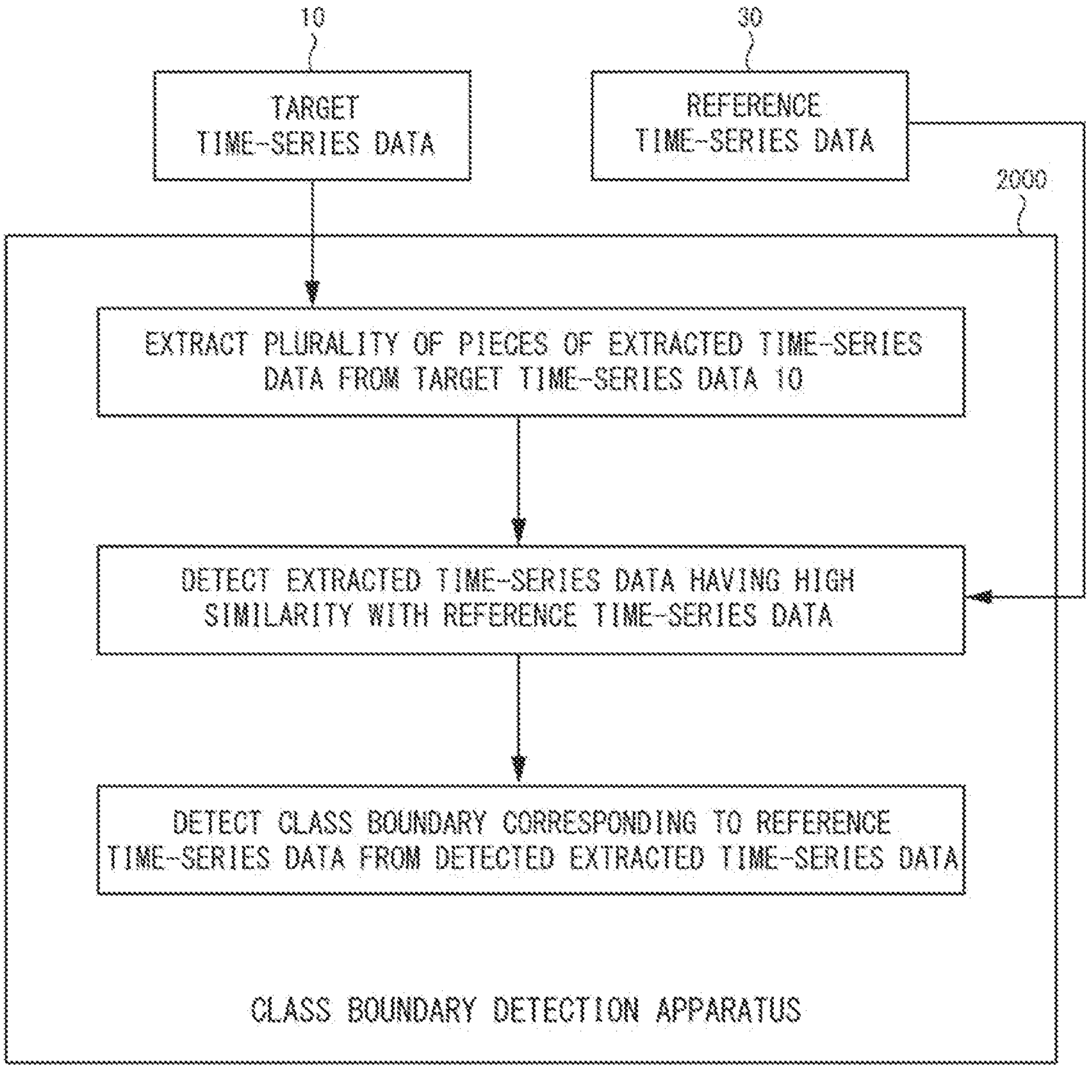
FIG. 2 is a diagram illustrating an overview of an operation of the class boundary detection apparatus.

FIG. 2 is a diagram illustrating an overview of an operation of the class boundary detection apparatus 2000 according to the example embodiment. Here, FIG. 2 is a diagram for facilitating understanding of the overview of the class boundary detection apparatus 2000, and the operation of the class boundary detection apparatus 2000 is not limited to that illustrated in FIG. 2. For example, in FIG. 2, the reference time-series data 30 is input to the class boundary detection apparatus 2000. However, as described later, the class boundary detection apparatus 2000 only needs to be able to calculate the similarity between the time-series data extracted from the target time-series data 10 and the reference time-series data 30, and does not need to acquire the reference time-series data 30 itself. For example, the class boundary detection apparatus 2000 may acquire the feature value of the reference time-series data 30 instead of the reference time-series data 30 itself.

The class boundary detection apparatus 2000 detects the boundary of the class from the target time-series data 10 whose boundary of the class is unknown. The boundary of the class in the target time-series data 10 means a boundary between the time-series data 20 belonging to a certain class and another time-series data 20 belonging to another class. For example, it is assumed that the class boundary detection apparatus 2000 handles the target time-series data 10 illustrated in FIG. 1. In this case, the class boundary detection apparatus 2000 detects a boundary between the time-series data 20-1 and the time-series data 20-2 (boundary between the class C1 and the class C2) or a boundary between the time-series data 20-2 and the time-series data 20-3 (boundary between the class C2 and the class C3) as a class boundary.

The class boundary can be represented by data immediately before the class boundary or data immediately after the class boundary. For example, in the example of FIG. 1, the boundary between the time-series data 20-1 and the time-series data 20-2 can be represented by tail data of the time-series data 20-1 or head data of the time-series data 20-2.

Figure 3:
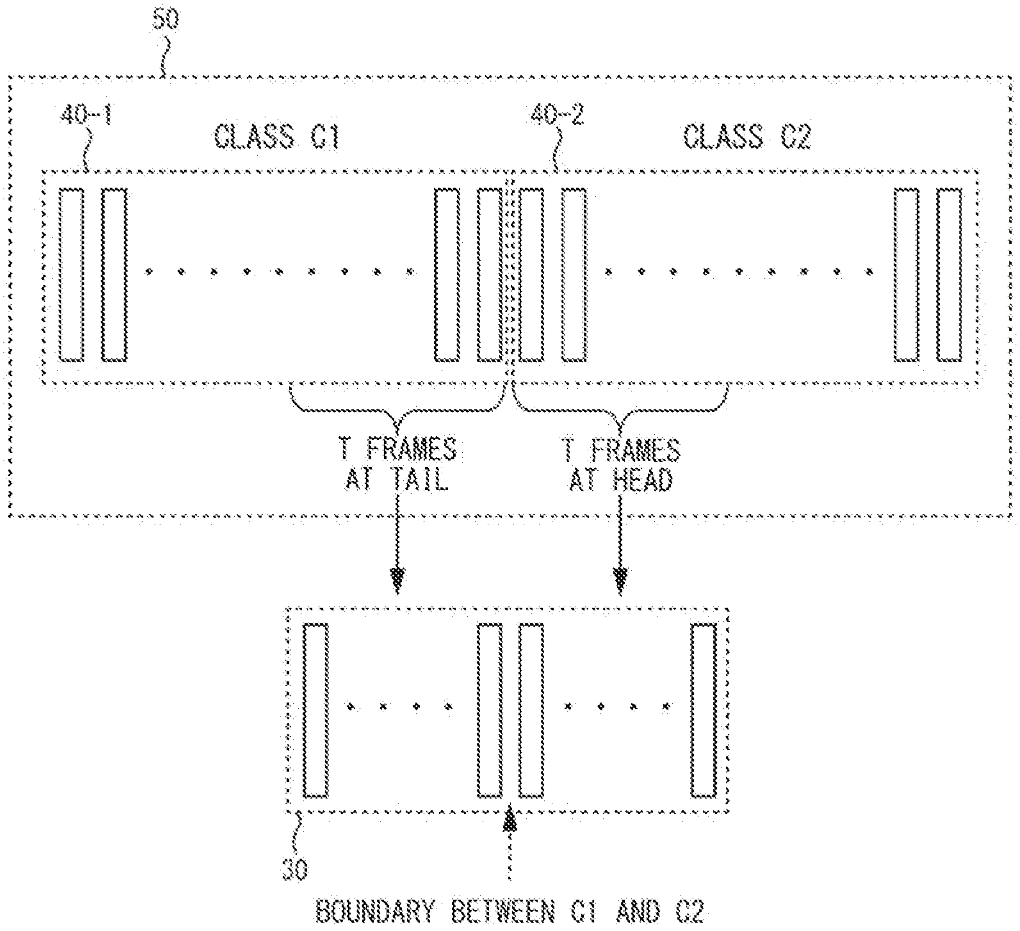
FIG. 3 is a diagram illustrating reference time-series data.

The class boundary detection apparatus 2000 uses the reference time-series data 30 to detect a class boundary. FIG. 3 is a diagram illustrating the reference time-series data 30. The reference time-series data 30 is obtained from the time-series data 50. The time-series data 50 includes time-series data 40-2 belonging to another class next to the time-series data 40-1 belonging to a certain class. The reference time-series data 30 is time-series data including frames (for example, a predetermined number of frames before and after the class boundary) around the boundary between the time-series data 40-1 and the time-series data 40-2.

In FIG. 3, the time-series data 40-1 belongs to class C1, while the time-series data 40-2 belongs to class C2. The reference time-series data 30 includes T frames (T at the tail of the time-series data 40-1 and T at the head of the time-series data 40-2) before and after the boundary between the class C1 and the class C2 (T is a natural number). Note that, in the reference time-series data 30, the number of frames before the class boundary and the number of frames after the class boundary may be different from each other.

Hereinafter, the type of the class boundary represented by the reference time-series data 30 is referred to as "a boundary type corresponding to the reference time-series data 30". For example, in FIG. 3, the boundary type corresponding to the reference time-series data 30 is "the boundary between the class C1 and the class C2".

The class boundary detection apparatus 2000 extracts one or more pieces of time-series data whose length is same as the reference time-series data 30 from the target time-series data 10, and calculates similarity between each piece of the extracted time-series data and the reference time-series data 30. Here, the time-series data extracted from the target time-series data 10 is referred to as extracted time-series data. The class boundary detection apparatus 2000 detects extracted time-series data having a high similarity (for example, the similarity is equal to or more than a threshold.) to the reference time-series data 30, and detects a class boundary of a boundary type corresponding to the reference time-series data 30 from the detected extracted time-series data. Hereinafter, the extracted time-series data having high similarity with the reference time-series data 30 is also referred to as "extracted time-series data matching the reference time-series data 30".

Figure 4:
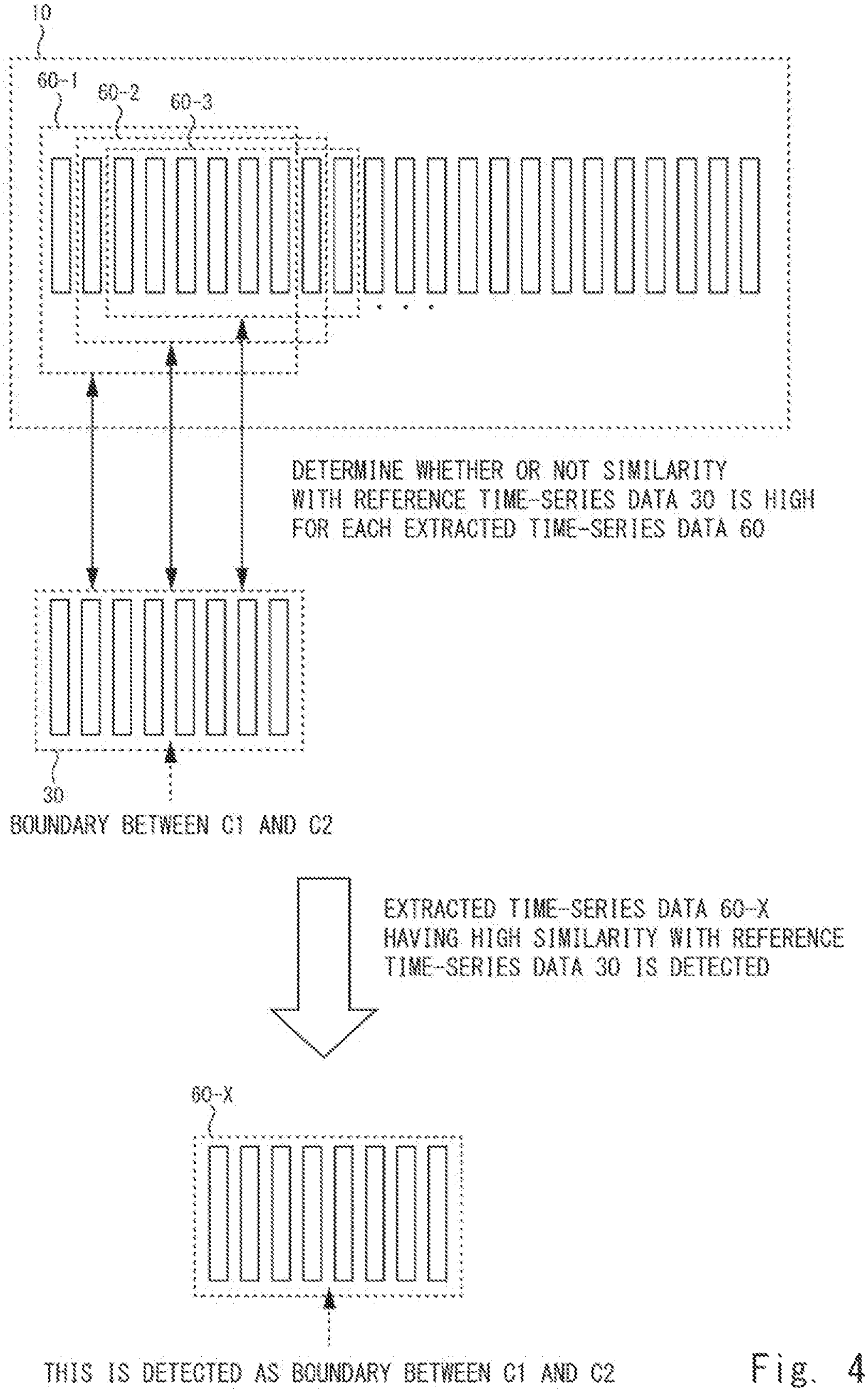
FIG. 4 is a diagram illustrating detection of a class boundary using the reference time-series data.

FIG. 4 is a diagram illustrating detection of the class boundary using the reference time-series data 30. The type of the class boundary detected in the example of FIG. 4 is a boundary between the class C1 and the class C2. Therefore, the reference time-series data 30 corresponding to the boundary type of the boundary between the class C1 and the class C2 is used.

The class boundary detection apparatus 2000 extracts a plurality of pieces of the extracted time-series data 60 from the target time-series data 10, and determines whether or not the similarity with the reference time-series data 30 is high for each piece of the extracted time-series data 60. For example, in FIG. 4, the extracted time-series data 60-X is detected as the extracted time-series data 60 having a high similarity with the reference time-series data 30. Therefore, the class boundary detection apparatus 2000 detects a boundary between the class C1 and the class C2 from the extracted time-series data 60-X.

In the reference time-series data 30 of FIG. 4, the number of frames belonging to the class C1 and the number of frames belonging to the class C2 are equal to each other. In this case, also in the extracted time-series data 60-X, the number of frames belonging to the class C1 and the number of frames belonging to the class C2 are highly likely to be equal to each other. Therefore, the class boundary detection apparatus 2000 detects a portion that divides the extracted time-series data 60-X into two equal parts as a boundary between the class C1 and the class C2.

<Example of Advantageous Effect>

According to the present example embodiment, the class boundary can be automatically detected from the target time-series data 10 based on the similarity between each piece of the extracted time-series data 60 extracted from the target time-series data 10 and the reference time-series data 30. Therefore, it is possible to more easily detect the boundary of the class from the target time-series data 10 as compared with the case where it is necessary to manually assign the label of the class to the frame constituting the target time-series data 10.

Furthermore, as will be described later, for each type of class boundary that can be included in the target time-series data 10, when a class boundary of the type is detected from the target time-series data 10, it is possible to determine a class to which each frame located between adjacent class boundaries belongs. For example, when there is a boundary between the classes C2 and C3 after the boundary between the classes C1 and C2, it is understood that each frame located between these boundaries belongs to the class C2. Therefore, it is possible to automatically assign a class label to each frame constituting the target time-series data 10, and thus it is easy to label the frame.

The time-series data labeled with respect to each frame in this manner can be used as training data, for example, when generating a machine learning model that automatically performs class determination for the time-series data. For example, at a product manufacturing site, in order to improve production quality, production efficiency, or safety of a worker, it is conceivable to perform automatic discrimination of a work process by analyzing, with a machine learning model, video data obtained by capturing a scene in which the worker is performing work. In order to train such a machine learning model, it is necessary to prepare a large amount of labeled video data. However, manually preparing a large amount of labeled video data requires a lot of time and effort.

In this regard, as described above, when the class boundary is detected from the target time-series data 10 using the class boundary detection apparatus 2000, labeling of each frame of the target time-series data 10 can be easily performed in a short time. Therefore, the time-series data required for training the machine learning model can be easily prepared in a short time.

Hereinafter, the class boundary detection apparatus 2000 according to the present example embodiment will be described in more detail.

<Example of Functional Configuration>

Figure 5:
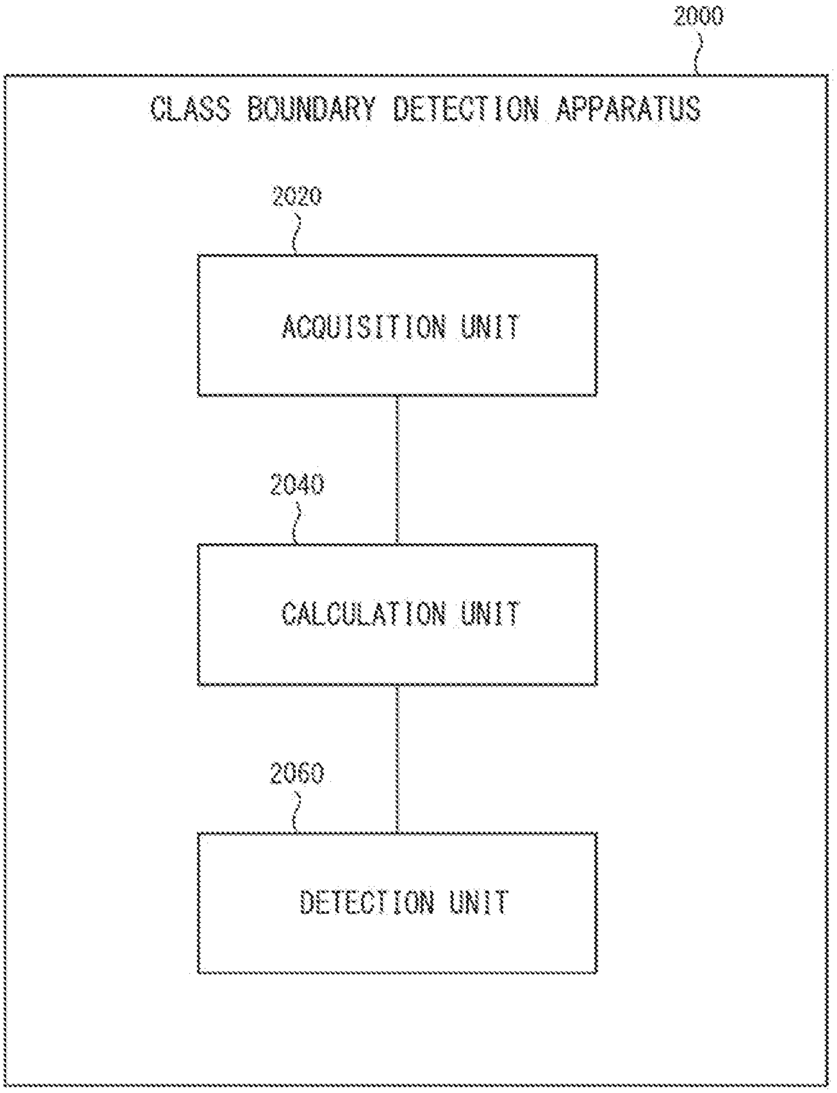
FIG. 5 is a block diagram illustrating a functional configuration of a class boundary detection apparatus.

FIG. 5 is a block diagram illustrating a functional configuration of the class boundary detection apparatus 2000 according to the embodiment. The class boundary detection apparatus 2000 includes an acquisition unit 2020, a calculation unit 2040, and a detection unit 2060. The acquisition unit 2020 acquires the target time-series data 10. The calculation unit 2040 extracts a plurality of pieces of the extracted time-series data 60 from the target time-series data 10, and calculates similarity between each piece of the extracted time-series data 60 and the reference time-series data 30. The detection unit 2060 detects a class boundary from the target time-series data 60 based on the similarity calculated for each piece of the extracted time-series data 10. For example, when the reference time-series data 30 is time-series data at and around the boundary between the class C1 and the class C2, the class boundary detection apparatus 2000 detects the boundary between the class C1 and the class C2 from the target time-series data 10.

<Example of Hardware Configuration>

Each functional component of the class boundary detection apparatus 2000 may be realized by hardware (for example, a hard-wired electronic circuit or the like) that realizes each functional configuration unit, or may be realized by a combination of hardware and software (for example, a combination of an electronic circuit and a program for controlling the electronic circuit or the like). Hereinafter, a case where each functional configuration unit of the class boundary detection apparatus 2000 is realized by a combination of hardware and software will be further described.

Figure 6:
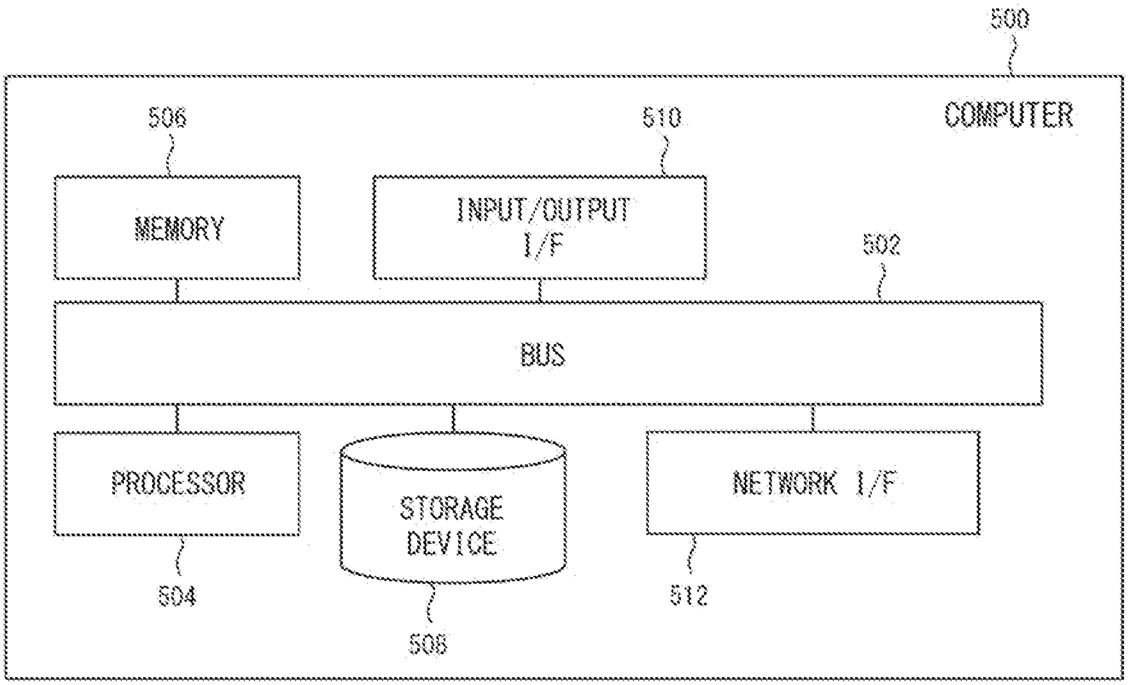
FIG. 6 is a block diagram illustrating a hardware configuration of a computer that implements the class boundary detection apparatus.

FIG. 6 is a block diagram illustrating a hardware configuration of a computer 500 that implements the class boundary detection apparatus 2000. The computer 500 is any computer. For example, the computer 500 is a stationary computer such as a personal computer (PC) or a server machine. In addition, for example, the computer 500 is a portable computer such as a smartphone or a tablet terminal. The computer 500 may be a dedicated computer designed to realize the class boundary detection apparatus 2000, or may be a general-purpose computer.

For example, by installing a predetermined application in the computer 500, each function of the class boundary detection apparatus 2000 is realized in the computer 500. The application is configured by a program for realizing each functional configuration unit of the class boundary detection apparatus 2000. Note that a method of acquiring the program is arbitrary. For example, the program can be acquired from a storage medium (a DVD disk, a USB memory, or the like) in which the program is stored. In addition, for example, the program can be acquired by downloading the program from a server device that manages a storage device in which the program is stored.

The computer 500 includes a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, the method of connecting the processor 504 and the like to each other is not limited to the bus connection.

The processor 504 is various processors such as a central processing unit (CPU), a graphics processing unit (GPU), or a field-programmable gate array (FPGA). The memory 506 is a main storage device realized by using a random access memory (RAM) or the like. The storage device 508 is an auxiliary storage device realized by using a hard disk, a solid state drive (SSD), a memory card, a read only memory (ROM), or the like.

The input/output interface 510 is an interface for connecting the computer 500 and an input/output device. For example, an input device such as a keyboard and an output device such as a display device are connected to the input/output interface 510.

The network interface 512 is an interface for connecting the computer 500 to a network. The network may be a local area network (LAN) or a wide area network (WAN).

The storage device 508 stores a program (program for realizing the above-described application) for realizing each functional configuration unit of the class boundary detection apparatus 2000. The processor 504 reads the program into the memory 506 and executes the program to implement each functional configuration unit of the class boundary detection apparatus 2000.

The class boundary detection apparatus 2000 may be realized by one computer 500 or may be realized by a plurality of computers 500. In the latter case, the configurations of the computers 500 do not need to be the same, and can be different from each other.

Some or all of the functions of the class boundary detection apparatus 2000 may be realized by a device that generates the target time-series data 10. In a case where all the functions of the class boundary detection apparatus 2000 are implemented by the device that has generated the target time-series data 10, for example, the device detects a class boundary from the target time-series data 10 generated by the device itself, and outputs information indicating the class boundary together with the target time-series data 10.

For example, it is assumed that the target time-series data 10 is video data. In this case, some or all of the functions of the class boundary detection apparatus 2000 may be realized by the video camera that generates the video data. As such a video camera, for example, a camera called a network camera, an internet protocol (IP) camera, or an intelligent camera can be used. In a case where all the functions of the class boundary detection apparatus 2000 are implemented by a video camera, for example, the video camera detects a class boundary for video data generated by the video camera itself, and outputs information indicating the class boundary (output information to be described later) together with the video data.

<Flow of Processing>

Figure 7:
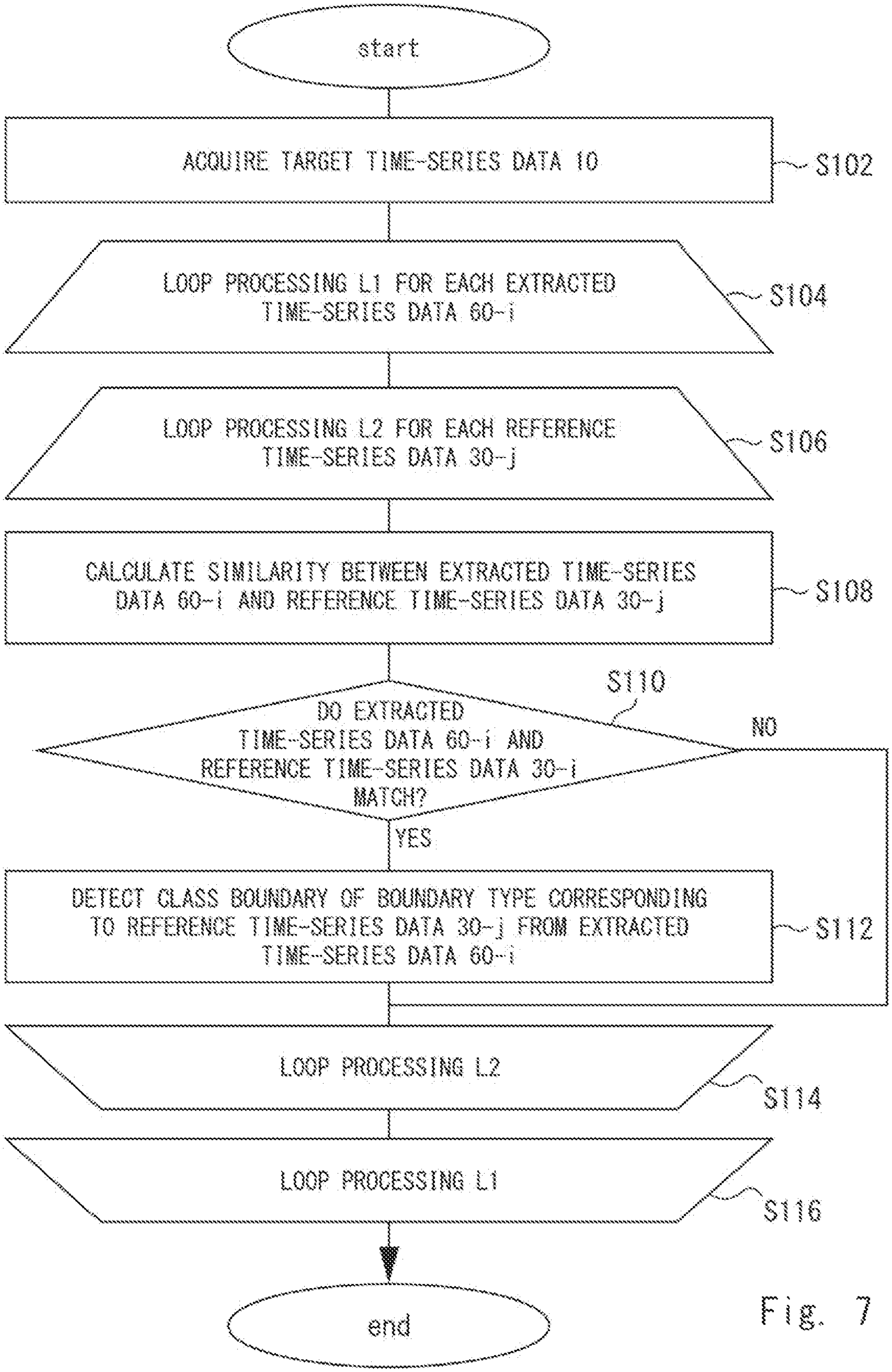
FIG. 7 is a flowchart illustrating a flow of processing executed by the class boundary detection apparatus.

FIG. 7 is a flowchart illustrating a flow of processing executed by the class boundary detection apparatus 2000 according to the example embodiment. The acquisition unit 2020 acquires the target time-series data 10 (S102). S104 to S116 constitute loop processing L1 executed for each piece of the extracted time-series data 60 extracted from the target time-series data 10. In S104, the class boundary detection apparatus 2000 determines whether or not the loop processing L1 has been executed for all the extracted time-series data 60. In a case where the loop processing L1 has already been executed for all the extracted time-series data 60, the processing of FIG. 7 ends. Meanwhile, in a case where there is the extracted time-series data 60 that is not yet targeted for the loop processing L1, the loop processing L1 is executed for the next extracted time-series data 60. Here, the extracted time-series data 60 to be subjected to the loop processing L1 is referred to as extracted time-series data 60-*i*.

S106 to S114 constitute loop processing L2 executed for each of the one or more pieces of reference time-series data 30. Each reference time-series data 30 corresponds to a different class boundary. In S106, the class boundary detection apparatus 2000 determines whether or not the loop processing L2 has been executed for all the reference time-series data 30. In a case where the loop processing L2 has already been executed for all the reference time-series data 30, the processing of FIG. 7 proceeds to S116. Since S116 is the end of the loop processing L1, the processing of FIG. 7 proceeds to S104.

Meanwhile, in a case where there is reference time-series data 30 not yet subjected to the loop processing L2, the loop processing L2 is executed for the next reference time-series data 30. Here, the reference time-series data 30 to be subjected to the loop processing L2 is referred to as reference time-series data 30-*j*.

The calculation unit 2040 calculates similarity between the extracted time-series data 60-*i* and the reference time-series data 30-*j* (S108). The detection unit 2060 determines whether or not the extracted time-series data 60-*i* and the reference time-series data 30-*j* match based on the similarity between the extracted time-series data 60-*i* and the reference time-series data 30-*j* (S110). For example, in a case where the similarity between the extracted time-series data 60-*i* and the reference time-series data 30-*j* is equal to or more than a predetermined threshold, the detection unit 2060 determines that they match. Meanwhile, in a case where the similarity is less than the predetermined threshold, the detection unit 2060 determines that they do not match.

When the extracted time-series data 60-*i* matches the reference time-series data 30-*j* (S110: YES), the detection unit 2060 detects a class boundary of a boundary type corresponding to the reference time-series data 30-*j* from the extracted time-series data 60-*i* (S112). After S112 is executed or after it is determined that the extracted time-series data 60-*i* and the reference time-series data 30-*j* do not match (S110: NO), the processing of FIG. 7 proceeds to S114. Since S114 is the end of the loop processing L2, the processing of FIG. 7 proceeds to S106.

Note that the flow of processing illustrated in FIG. 7 is an example, and the flow of processing executed by the class boundary detection apparatus 2000 is not limited to the flow illustrated in FIG. 7. For example, instead of including the loop processing L2 in the loop processing L1, the loop processing L1 may be included in the loop processing L2.

<Acquisition of Target Time-Series Data 10: S102>

The acquisition unit 2020 acquires the target time-series data 10. Here, various methods can be adopted as a method of acquiring time-series data to be analyzed. For example, it is assumed that the target time-series data 10 is stored in advance in an arbitrary storage device in a manner that can be acquired from the class boundary detection apparatus 2000. In this case, the acquisition unit 2020 acquires the target time-series data 10 by reading the target time-series data 10 from the storage device. Note that the storage device in which the target time-series data 10 is stored may be provided inside or outside the class boundary detection apparatus 2000. In a case where the storage device in which the target time-series data 10 is stored is provided outside the class boundary detection apparatus 2000, for example, the storage device is provided inside the device that has generated the target time-series data 10.

In addition, for example, the acquisition unit 2020 acquires the target time-series data 10 by receiving the target time-series data 10 transmitted from another device. The device that transmits the target time-series data 10 is, for example, a device that has generated the target time-series data 10. In a case where the target time-series data 10 is video data, for example, the acquisition unit 2020 acquires the target time-series data 10 from the video camera that has generated the target time-series data 10.

<Extraction of Extracted Time-Series Data 60>

The calculation unit 2040 extracts a plurality of different pieces of extracted time-series data 60 from the target time-series data 10. Here, the length of each piece of extracted time-series data is assumed to be the same as the length of the reference time-series data 30.

Various existing technologies can be used as a technology for extracting a plurality of pieces of time-series data having a specific length shorter than that from one piece of time-series data. For example, the calculation unit 2040 extracts a plurality of pieces of the extracted time-series data 60 from the target time-series data 10 using the sliding window. The length of the reference time-series data 30 is set to the width of the sliding window (that is, the length of the extracted time-series data 60). An arbitrary value can be set as a stride (that is, an interval between two adjacent pieces of the extracted time-series data 60.) of the sliding window. For example, when the value of the stride is set to 1, all the pieces of extracted time-series data 60 that can be extracted from the target time-series data 10 are extracted in order from the head of the target time-series data 10.

There are various methods for the calculation unit 2040 to determine the length of the reference time-series data 30. For example, information indicating the length of the reference time-series data 30 is set in the calculation unit 2040 in advance. In addition, for example, information indicating the length of the reference time-series data 30 is stored in the storage device in advance in a manner accessible from the class boundary detection apparatus 2000. In this case, the calculation unit 2040 determines the length of the reference time-series data 30 by acquiring information indicating the length of the reference time-series data 30 from the storage device. In addition, for example, the calculation unit 2040 may determine the length of the reference time-series data 30 by acquiring the reference time-series data 30.

<Acquisition of Information on Reference Time-Series Data 30>

The acquisition unit 2020 acquires data necessary for calculating the similarity with the extracted time-series data 60 for the reference time-series data 30 corresponding to the type of the class boundary desired to be detected. This data is referred to as reference data. For example, the reference data is the reference time-series data 30 itself. In addition, for example, the reference data is a feature value extracted from the reference time-series data 30. The feature value will be described later.

For example, the reference data is stored in the storage device in advance in a manner that can be acquired from the class boundary detection apparatus 2000 together with the boundary type identification information indicating the type of the corresponding class boundary. FIG. 8 is a diagram illustrating reference data. A table 100 of FIG. 8 indicates reference data 90 corresponding to the boundary type determined by the boundary type identification information in association with the boundary type identification information 80. In FIG. 8, the reference data 90 is a feature value of the reference time-series data 30.

Here, the type of the class boundary can be expressed by an order pair of classes. For example, the type of the boundary between the class C1 and the class C2 (the boundary representing the transition portion from the class C1 to the class C2) can be represented by an order pair (C1, C2). Therefore, in FIG. 8, the order pair of classes is used as the boundary type identification information 80.

There are various methods for determining the reference data 90 to be acquired by the acquisition unit 2020. For example, the acquisition unit 2020 acquires all pieces of the reference data 90 stored in the storage device. In addition, for example, the acquisition unit 2020 determines a boundary type of a class boundary that may be included in the target time-series data 10, and acquires the reference data 90 corresponding to each determined boundary type.

For example, it is assumed that the class included in the target time-series data 10 is known. In this case, the type of class boundary that can be included in the target time-series data 10 can be represented by all sets of order pairs of classes that can be included in the target time-series data 10. For example, it is assumed that the classes that can be included in the target time-series data 10 are three classes C1, C2, and C3. In these three classes, there are six order pairs: (C1, C2), (C1, C3), (C2, C1), (C2, C3), (C3, C1), and (C3, C2). Therefore, the types of class boundaries included in the target time-series data 10 are these six types.

Therefore, for example, the acquisition unit 2020 acquires the corresponding reference data 90 for the boundary types represented by the order pairs of the classes that can be included in the target time-series data 10. For example, in a case where the above three classes can be included in the target time-series data 10 in an arbitrary order, the class boundary detection apparatus 2000 acquires the reference data 90 for the boundary type represented by each of the above six order pairs. As a more specific example, for the boundary type represented by each of the above six order pairs, the feature value of the corresponding reference time-series data 30 or the corresponding reference time-series data 30 is acquired as the reference data 90.

<Generation of Reference Time-Series Data 30>

In order to prepare the reference data 90, it is necessary to generate the reference time-series data 30 as a premise. Further, as described with reference to FIG. 3, since the reference time-series data 30 is a part of the time-series data 50 including the two time-series data 40-1 and 40-2, it is necessary to generate the time-series data 50 in order to generate the reference time-series data 30.

Here, there are various methods of generating the time-series data 50. For example, it is assumed that the time-series data 50 including the boundary between the classes C1 and C2 is generated. In this case, for example, the time-series data 50 is generated by causing a device (a camera, various sensors, or the like) for generating the time-series data 50 to actually observe a desired situation. For example, it is assumed that the time-series data 50 is video data, and the class C1 and the class C2 are types of work processes. In this case, video data including the boundary between the classes C1 and C2 can be obtained by capturing an image of a scene where the work process C2 is performed after the work process C1 is performed with a camera.

In addition, for example, the time-series data 50 may be generated by individually generating the time-series data 40-1 before the class boundary and the time-series data 40-2 after the class boundary and then joining them by an arbitrary method. For example, as described above, it is assumed that each of the classes C1 and C2 is a work process. In this case, the time-series data 40-1 is generated by capturing an image of a situation in which the work process C1 is performed with a camera. Similarly, the time-series data 40-2 is generated by capturing an image of the scene in which the work process C2 is performed with the camera. Thereafter, the time-series data 50 including the boundary between the classes C1 and C2 can be generated by connecting the time-series data 40-2 after the time-series data 40-1 using video editing software or the like.

The reference time-series data 30 can be generated by extracting a boundary portion and its surrounding frames from the time-series data 50. Here, an existing method can be used as a method of extracting a part of the time-series data from the time-series data.

When the time-series data 40-1 and the time-series data 40-2 are individually generated, the reference time-series data 30 may be generated without generating the time-series data 50. For example, the reference time-series data 30 including the T frames before and after the boundary between the classes C1 and C2 can be generated by extracting the tail T frames of the time-series data 40-1 and the head T frames of the time-series data 40-2 and joining them.

<Similarity Calculation: S108>

The calculation unit 2040 calculates similarity between the extracted time-series data 60 and the reference time-series data 30 (S108). The similarity between the extracted time-series data 60 and the reference time-series data 30 can be represented by, for example, similarity between these feature values. In this case, the calculation unit 2040 calculates a feature value from the extracted time-series data 60. Furthermore, in a case where the reference data 90 represents the reference time-series data 30 itself, the calculation unit 2040 also calculates the feature value for the reference time-series data 30. When the reference data 90 represents the feature value of the reference time-series data 30, the feature value of the reference time-series data 30 represented by the reference data 90 is assumed to be calculated in advance from the reference time-series data 30 by the same method as the method of calculating the feature value from the extracted time-series data 60.

Here, various methods can be used as a method of calculating the feature value of the time-series data. For example, the calculation unit 2040 calculates the feature value f for each frame constituting the time-series data, and uses data in which the feature values f calculated for the respective frames are connected as the feature value F of the time-series data. For example, it is assumed that a feature value of the i-th frame of the extracted time-series data 60 is represented as fi, and the extracted time-series data 60 includes N frames. In this case, the feature value F of the extracted time-series data 60 can be expressed as F=(f1, f2, . . . , fN). The same applies to the feature value of the reference time-series data 30.

There are various methods for calculating the feature value from each frame. For example, it is assumed that the target time-series data is video data. In this case, the frame is a video frame constituting video data. Therefore, for example, the calculation unit 2040 extracts an image feature from a frame as a feature value of the frame. Here, any existing technology can be used as a technology for extracting an image feature from image data. For example, by inputting a video frame to a convolutional neural network (CNN) that handles image data such as ResNet, the feature value of the video frame can be obtained from the intermediate layer.

Furthermore, the calculation unit 2040 may calculate the feature value of the video frame by adding arbitrary data to the image feature extracted from the video frame. Hereinafter, the data added to the image feature is referred to as additional data. For example, it is assumed that an image feature of a video frame is represented by an M-dimensional vector, and additional data is represented by an L-dimensional vector. In this case, the feature value of the video frame can be represented by a (M+L) dimensional vector obtained by connecting these vectors.

There are various types of additional data. For example, the calculation unit 2040 detects a specific object from the video frame and calculates additional data indicating the posture of the object. For example, it is assumed that the target time-series data 10 is video data generated by capturing a human work. In this case, data representing a human posture (a posture of a hand, a posture of a moving body, a posture of a face, or the like) can be used as the additional data. Note that various existing expressions can be used for the data expression of the posture.

The feature value of the time-series data is not limited to data in which the feature values of the frames are connected. For example, the calculation unit 2040 calculates a feature value in consideration of the time series of frames for the time-series data. Here, various existing technologies can be used as a technology for extracting a feature value in consideration of time series from time-series data. For example, by inputting time-series data to a 3D CNN capable of considering time series such as I3D, the feature value of the time-series data can be obtained from the intermediate layer.

The calculation unit 2040 calculates the similarity between the feature value of the extracted time-series data 60 and the feature value of the reference time-series data 30 as the similarity between the extracted time-series data 60 and the reference time-series data 30. Here, various methods can be used as a method of calculating the similarity between the two feature values. For example, it is assumed that the feature value of the time-series data is data in which the feature values of the frames are connected. In this case, the calculation unit 2040 calculates the similarity for each frame with respect to the feature value of the extracted time-series data 60 and the feature value of the reference time-series data 30, and handles a statistical value (such as an average value) of the calculated similarities as the similarity of these feature values. Here, various indexes such as norm and cosine similarity can be used to calculate the similarity between the feature values of the two frames. Note that, also in a case where the additional data described above is included in the feature value, the similarity between the feature value of the extracted time-series data 60 and the feature value of the reference time-series data 30 can be calculated by a similar method.

The method for calculating the similarity between the extracted time-series data 60 and the reference time-series data 30 is not limited to the method using these feature values. For example, in calculating the similarity, a machine learning model (for example, a neural network) trained in advance to output the similarity in response to input of two pieces of time-series data is used. In this case, the calculation unit 2040 can obtain the similarity between the extracted time-series data 60 and the reference time-series data 30 by inputting these pieces of data to the trained model. Note that an existing technology can be used as a technology for training the machine learning model so as to calculate the similarity between the two pieces of time-series data.

<Detection of Class Boundary: S112>

When the extracted time-series data 60 and the reference time-series data 30 match (S110: YES), the detection unit 2060 detects a class boundary from the extracted time-series data 60. More specifically, the detection unit 2060 determines the type and position of the class boundary included in the extracted time-series data 60 determined to match the reference time-series data 30.

The type of the class boundary included in the extracted time-series data 60 is a boundary type corresponding to the reference time-series data 30 matching the extracted time-series data 60. For example, it is assumed that the extracted time-series data 60 matching the reference time-series data 30 of which the corresponding boundary type is (C1, C2) is detected. In this case, the detection unit 2060 determines that the type of the class boundary included in the extracted time-series data 60 is (C1, C2). In other words, this class boundary is determined as a boundary between the class C1 and the class C2.

The position of the class boundary in the extracted time-series data 60 can be determined based on the position of the class boundary in the reference time-series data 30 that matches the position of the class boundary. For example, it is assumed that the reference time-series data 30 determined to match the extracted time-series data 60 has the time-series data of a length Y belonging to the class C2 after the time-series data of a length X belonging to the class C1. In this case, the calculation unit 2040 determines the X-th frame from the head of the extracted time-series data 60 or the (X+1)-th frame from the head of the extracted time-series data 60 as a frame representing the position of the class boundary. Here, the X-th frame from the head of the extracted time-series data 60 represents the tail of a sequence of frames belonging to the class C1. Meanwhile, the (X+1)th frame from the head of the extracted time-series data 60 represents the head of a sequence of frames belonging to the class C2.

Here, the plurality of pieces of extracted time-series data 60 extracted from the periphery of the class boundary may be similar to the reference time-series data 30 corresponding to the type of the class boundary (high similarity). In this case, for example, the detection unit 2060 detects a class boundary from any one of the plurality of pieces of extracted time-series data 60. This point will be described with reference to FIG. 9.

Figure 9:
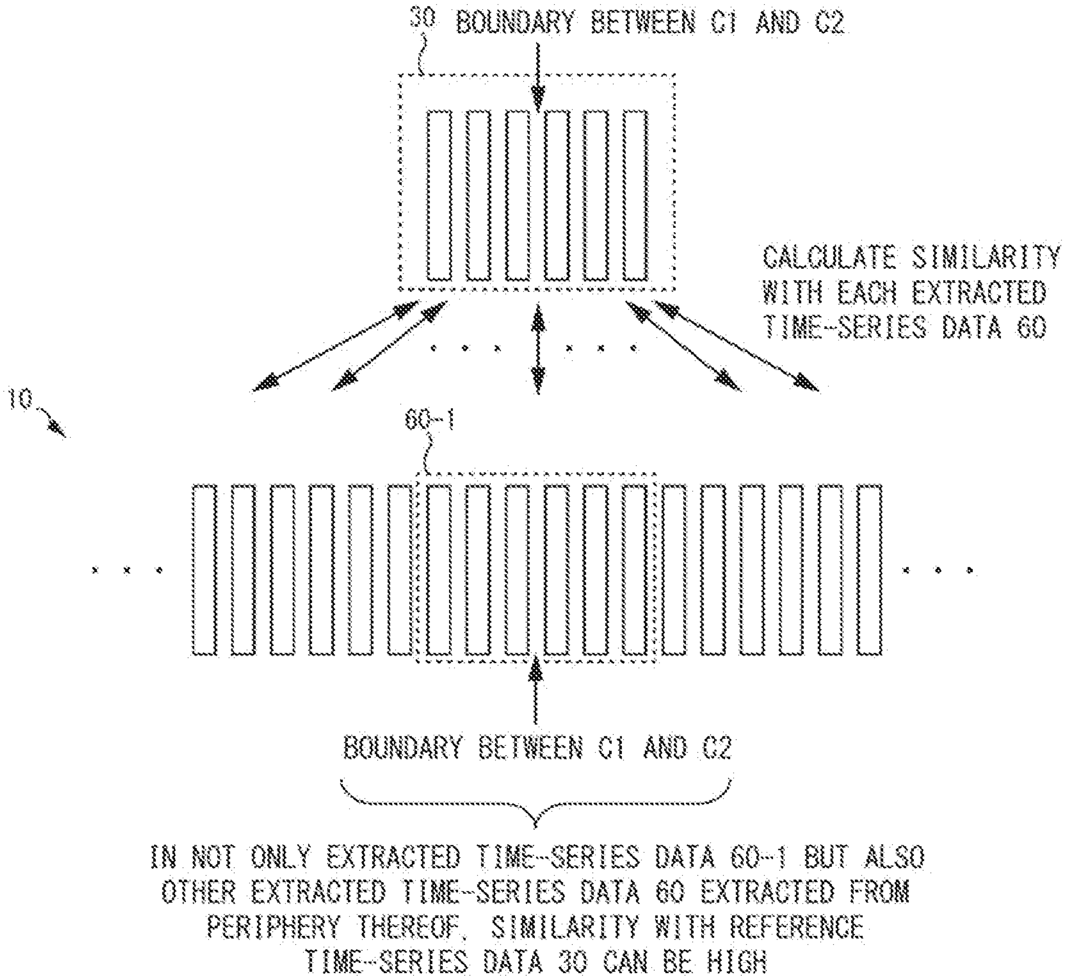
FIG. 9 is a diagram illustrating that a plurality of pieces of extracted time-series data extracted from the periphery of a class boundary can be similar to reference time-series data corresponding to a type of the class boundary.

FIG. 9 is a diagram illustrating that the plurality of pieces of extracted time-series data 60 extracted from the periphery of the class boundary can be similar to the reference time-series data 30 corresponding to the type of the class boundary. In FIG. 9, the reference time-series data 30 corresponds to a boundary type of (C1, C2), and a central portion thereof is a class boundary. Furthermore, the target time-series data 10 has a class boundary of (C1, C2).

Here, in the target time-series data 10 in FIG. 9, the extracted time-series data 60-1 has a class boundary of (C1, C2) at the center thereof. However, not only the extracted time-series data 60-1 but also other extracted time-series data 60 close thereto are located around the class boundary, and thus the similarity with the reference time-series data 30 can be high. Therefore, the extracted time-series data 60 having high similarity with the reference time-series data 30 can be detected in addition to the extracted time-series data 60-1.

As described above, in a case where a plurality of pieces of extracted time-series data 60 that are close to each other are detected as the extracted time-series data 60 similar to the reference time-series data 30, for example, the detection unit 2060 detects a class boundary from one of the plurality of pieces of extracted time-series data 60. Here, there are various methods for determining the extracted time-series data 60 used for detecting the class boundary. For example, the detection unit 2060 detects a class boundary from the extracted time-series data 60 having the highest similarity with the reference time-series data 30 among the plurality of pieces of extracted time-series data 60. In addition, for example, the detection unit 2060 detects a class boundary from the extracted time-series data 60 positioned at the center in chronological order among the plurality of pieces of extracted time-series data 60. For example, it is assumed that all of the seven pieces of extracted time-series data 60 close to each other are similar to the same reference time-series data 30. In this case, the extracted time-series data is determined as the extracted time-series data 60 used to detect the class boundary from the fourth extracted time-series data 60 from the front in the chronological order. In addition, for example, the detection unit 2060 randomly selects one from the plurality of pieces of extracted time-series data 60, and detects a class boundary from the selected extracted time-series data 60.

<Output of Processing Result>

Figure 10:
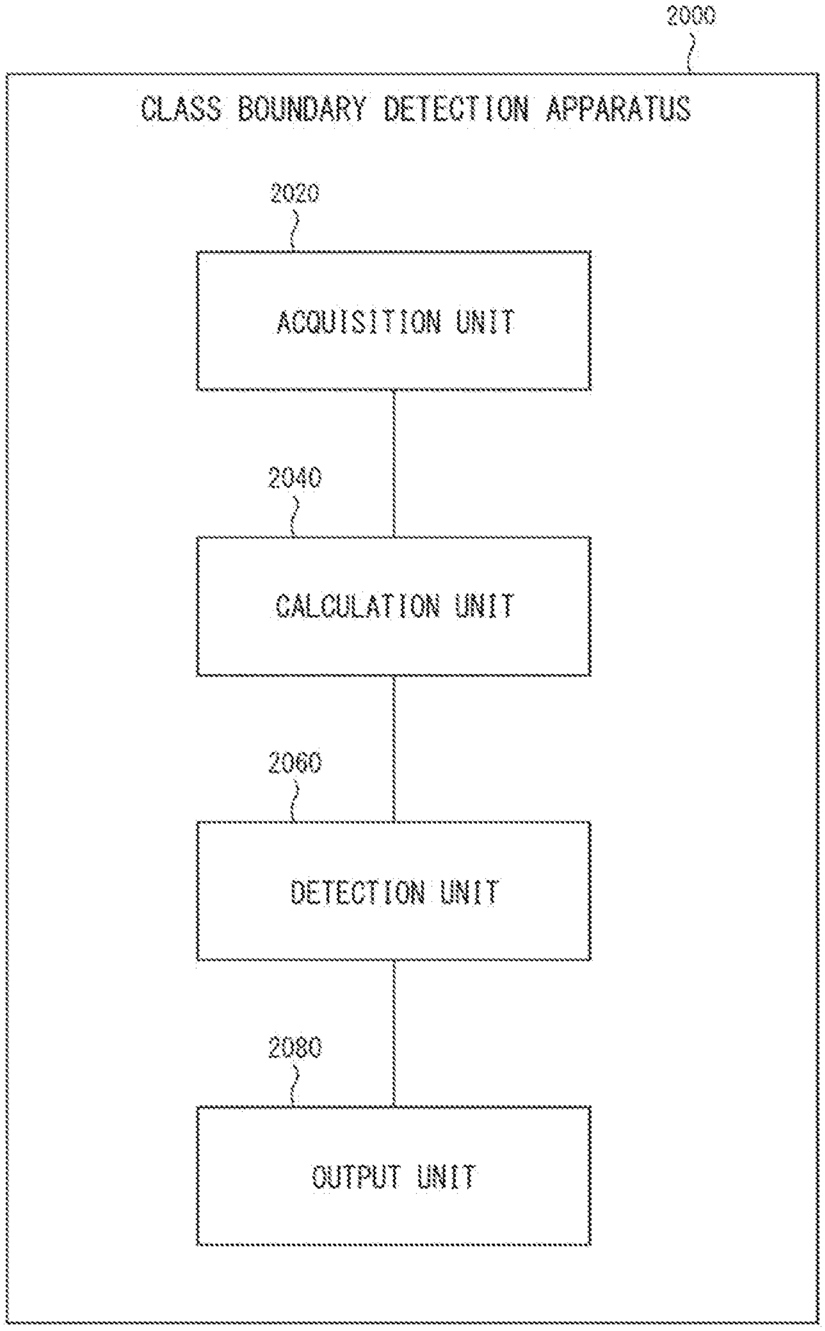
FIG. 10 is a block diagram illustrating a functional configuration of a class boundary detection apparatus including an output unit.

The class boundary detection apparatus 2000 may output the processing result by an arbitrary method. Hereinafter, the information output by the class boundary detection apparatus 2000 is referred to as output information. Furthermore, a functional configuration unit that generates and outputs output information is referred to as an output unit. FIG. 10 is a block diagram illustrating a functional configuration of the class boundary detection apparatus 2000 including an output unit 2080.

For example, the output unit 2080 generates information indicating a boundary type and a position of each detected class boundary as the output information. FIG. 11 is a diagram illustrating output information indicating a boundary type and a position of each class boundary. A table 110 of FIG. 11 indicates the boundary type identification information 112 and the boundary position 114 for each class boundary detected from the target time-series data 10. The boundary type identification information 112 indicates the type of the class boundary by an order pair of classes. The boundary position 114 indicates the position of the class boundary. Here, it is assumed that identification information (such as a frame number) of a frame located immediately before the class boundary is indicated as the position of the class boundary.

In addition, for example, the output unit 2080 generates, as the output information, the target time-series data 10 to which a label indicating a class to which each frame belongs is added to each frame. For example, in a case where each class boundary detected from the target time-series data 10 is illustrated in the example of FIG. 11, all the n1-th frames from the head frame of the target time-series data 10 belong to the class C1. Therefore, the output unit 2080 adds a label representing the class C1 to each of these frames. In the example of FIG. 11, the (n1+1)th to n2-th frames of the target time-series data 10 belong to the class C2. Therefore, the output unit 2080 gives a label representing the class C2 to each of these frames.

Here, in a case where the label of the class is manually added to each frame constituting the time-series data, a long time and a large effort are required. In this regard, when the class boundary detection apparatus 2000 is configured to output the target time-series data 10 to which the class label is assigned as the output information as described above, the processing of assigning the label of the class to which each frame of the target time-series data 10 belongs is automatically performed based on the detection result of the class boundary by the class boundary detection apparatus 2000. Therefore, the processing of assigning a label to each frame of the target time-series data 10 is easily realized in a short time.

The output mode of the output information is arbitrary. For example, the output unit 2080 stores the output information in an arbitrary storage device. In addition, for example, the output unit 2080 transmits output information to another device. In addition, for example, the output unit 2080 causes the display device to display the output information.

<Verification of Consistency of Class Boundary>

Figure 12:
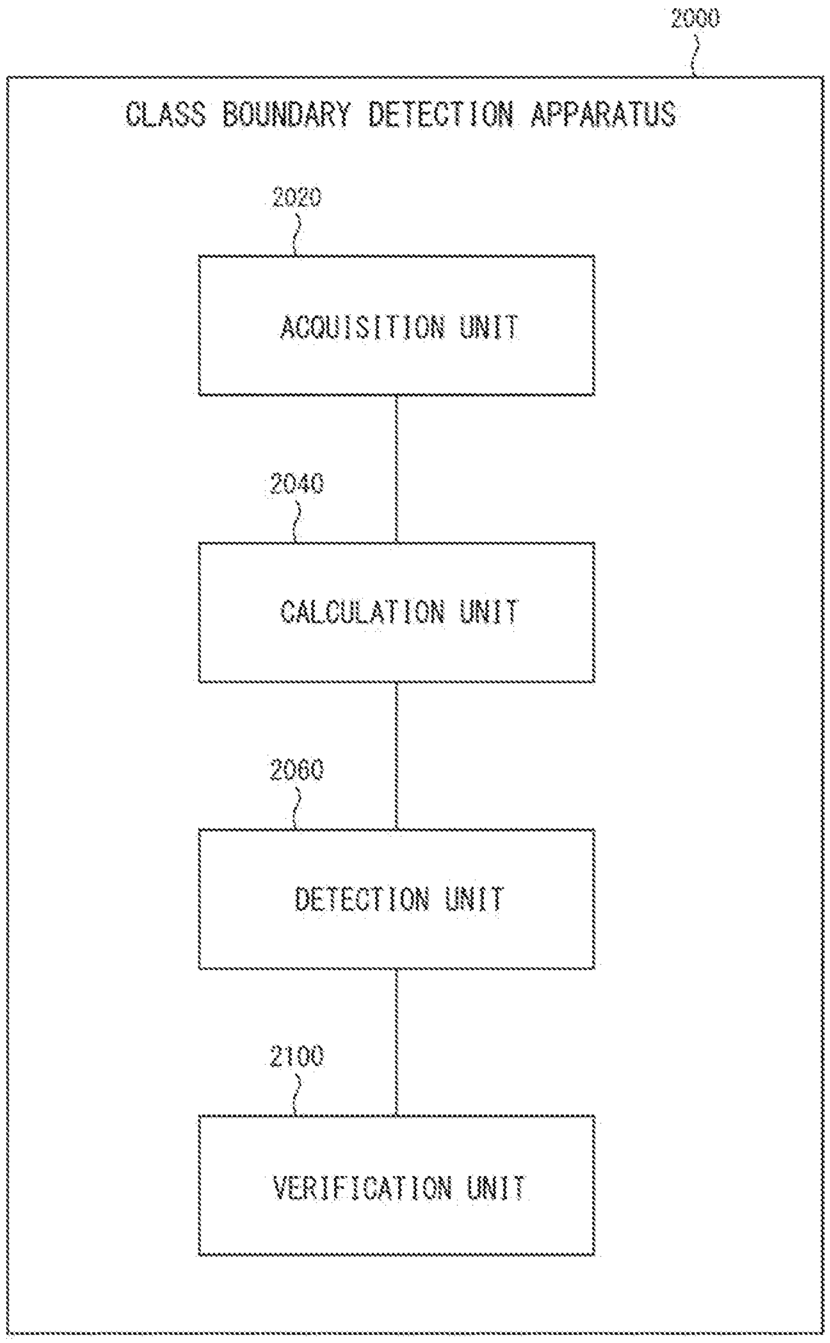
FIG. 12 is a block diagram illustrating a functional configuration of a class boundary detection apparatus including a verification unit.

In a case where class boundaries of a plurality of types are detected from the target time-series data 10, consistency of class boundaries adjacent to each other may be verified. Hereinafter, the functional configuration unit that performs this verification is referred to as a verification unit. FIG. 12 is a block diagram illustrating a functional configuration of the class boundary detection apparatus 2000 including the verification unit 2100.

Specifically, for two class boundaries adjacent to each other, the verification unit 2100 determines whether or not a subsequent class indicated by a front class boundary matches a preceding class indicated by a rear class boundary. When they match, the verification unit 2100 determines that the two class boundaries are consistent with each other. Meanwhile, in a case where they do not match, the verification unit 2100 determines that the two class boundaries are not consistent with each other. Note that the preceding class indicated by the class boundary means the first class in the order pair of the boundary types of the class boundary. For example, when the boundary type is (C1, C2), the preceding class indicated by the class boundary is C1. Meanwhile, the subsequent class indicated by the class boundary means the second class in the order pair of the boundary types of the class boundary. For example, when the boundary type is (C1, C2), the subsequent class indicated by the class boundary is C2.

Figure 13:
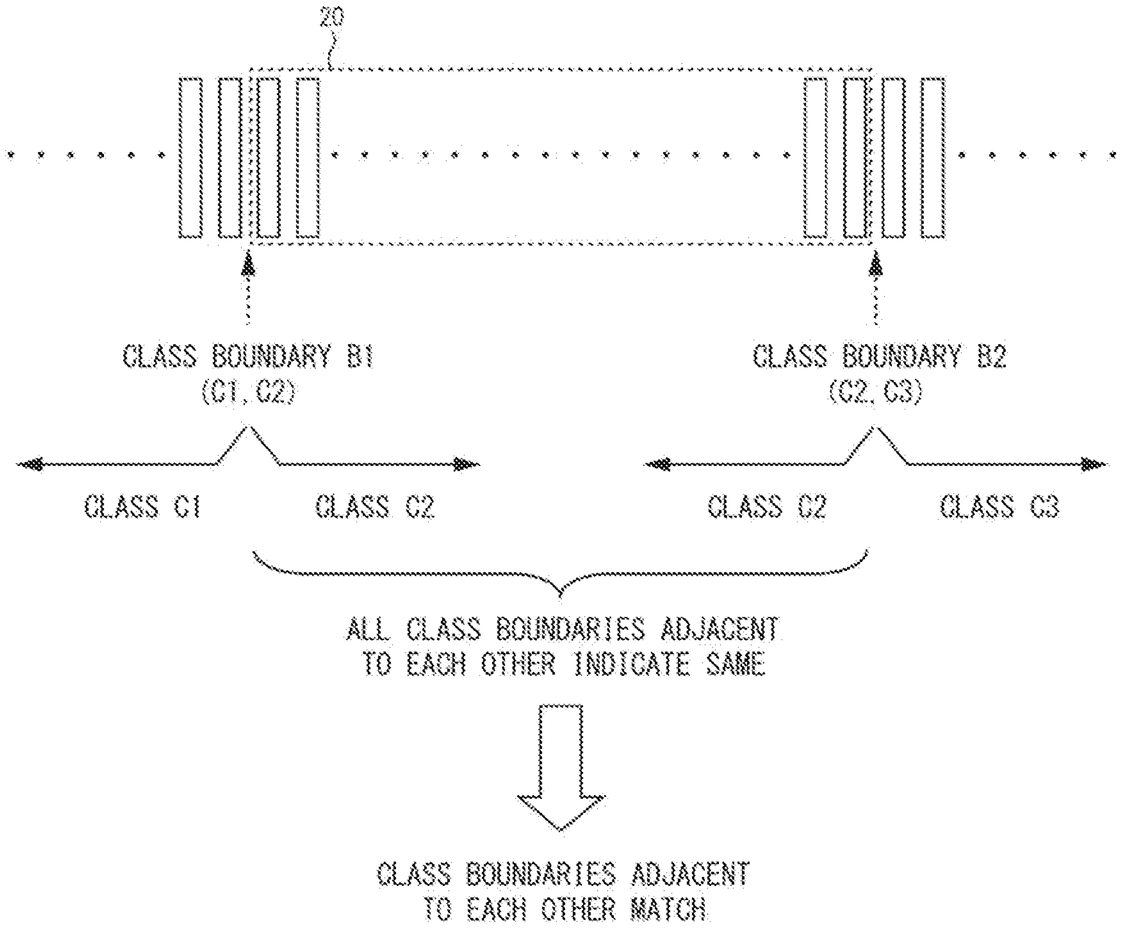
FIG. 13 is a diagram illustrating verification of consistency of class boundaries.
Figure 14:
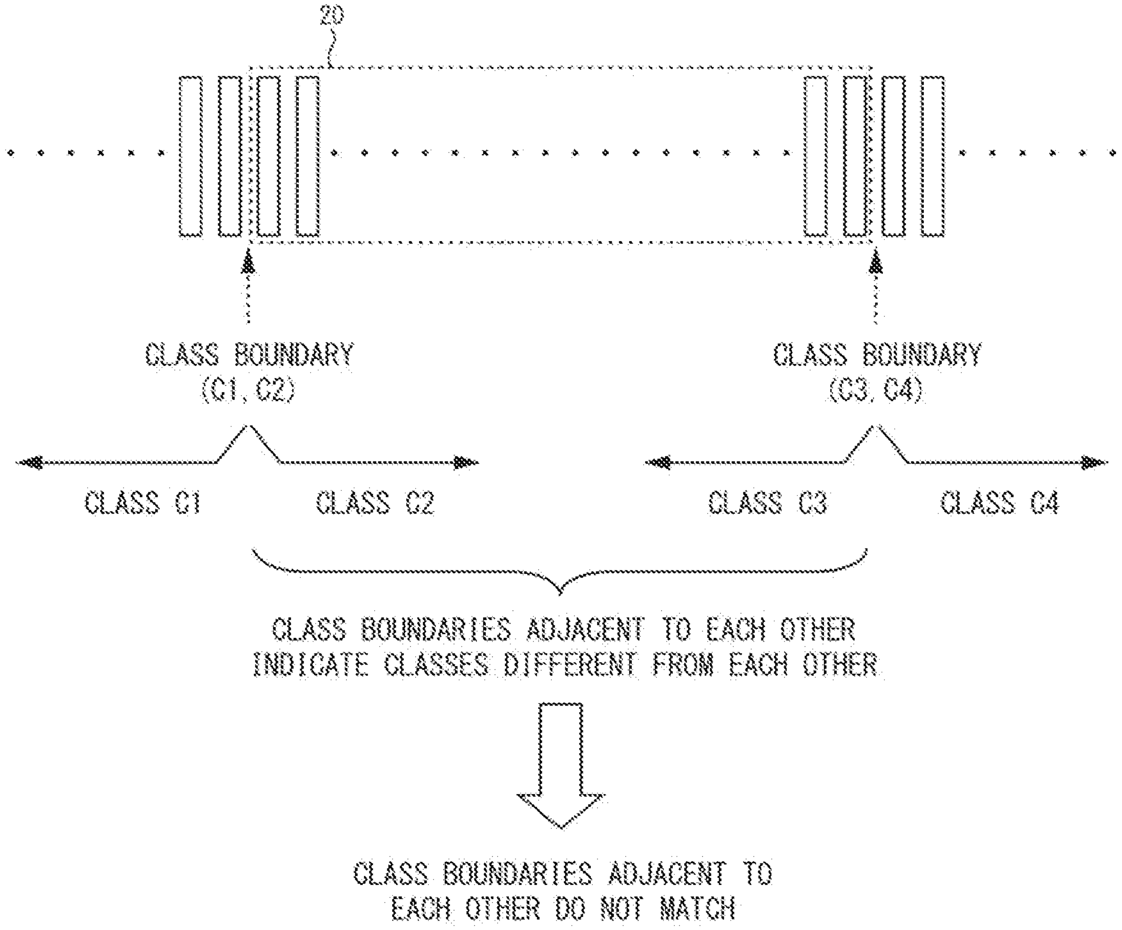
FIG. 14 is a diagram illustrating verification of consistency of class boundaries.

FIGS. 13 and 14 are diagrams illustrating verification of consistency of class boundaries. In FIG. 13, after a class boundary B1 of (C1, C2) is detected, a class boundary B2 of (C2, C3) is detected. Here, the subsequent class indicated by the front class boundary B1 is C2, and the preceding class indicated by the rear class boundary B2 is also C2. From this, both of these two class boundaries indicate that the time-series data 20 between these class boundaries belongs to the class C2. Therefore, it can be said that the class boundaries are consistent with each other.

Meanwhile, in FIG. 14, after a class boundary B3 of (C1, C2) is detected, a class boundary B4 of (C3, C4) is detected. Here, while the subsequent class indicated by the front class boundary B3 is C2, the preceding class indicated by the rear class boundary B4 is C3. In this case, the class boundary B3 indicates that the time-series data 20 between the class boundaries B3 and B4 belongs to the class C2. Meanwhile, the class boundary B4 indicates that the time-series data 20 belongs to the class C3. Therefore, these class boundaries are not consistent with each other.

Figure 15:
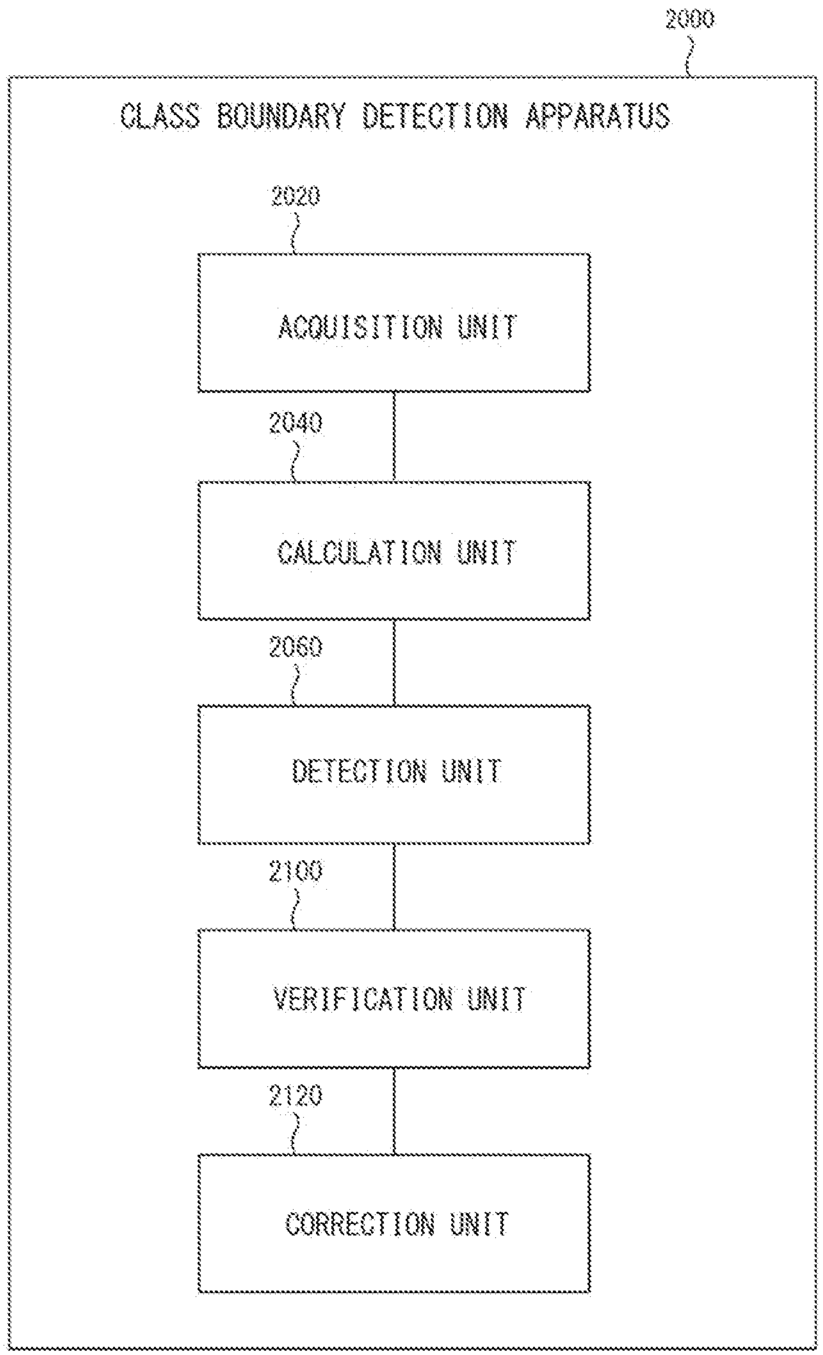
FIG. 15 is a block diagram illustrating a functional configuration of a class boundary detection apparatus including a correction unit.

The class boundary detection apparatus 2000 may execute various processes in response to the detection that the class boundaries are not consistent with each other. For example, in a case where it is determined that two certain class boundaries are not consistent with each other, the class boundary detection apparatus 2000 corrects the type of one of the class boundaries. A functional configuration unit that corrects the type of the class boundary is referred to as a correction unit. FIG. 15 is a block diagram illustrating a functional configuration of the class boundary detection apparatus 2000 including the correction unit 2120.

For example, for each of the two class boundaries determined not to be consistent with the adjacent class boundary (for example, class boundaries B3 and B4 in FIG. 14), the correction unit 2120 corrects the type of the class boundary based on the similarity between the extracted time-series data 60 used to detect the class boundary and the reference time-series data 30. Here, as a premise, it is assumed that the similarity of the feature values is calculated for each frame in order to calculate the similarity between the extracted time-series data 60 and the reference time-series data 30 when the class boundary is detected.

A boundary type correction method will be specifically described with reference to FIG. 16. FIG. 16 is a diagram illustrating a boundary type correction method. In FIG. 16, similarly to FIG. 14, after the class boundary B3 of which the boundary type is (C1, C2) is detected, the class boundary B4 of which the boundary type is (C3, C4) is detected.

A graph 130 indicates the similarity for each frame between the extracted time-series data 60 in which the class boundary B3 is detected and the reference time-series data 30 corresponding to the boundary type (C1, C2). Referring to the graph 130, the similarity for each frame is high for the portion before the class boundary B3, and the similarity for each frame is low for the portion before the class boundary B3. From this, it is considered that the reliability is high in that the portion before the class boundary B3 is the class C1, and the reliability is low in that the portion after the class boundary B3 is the class C2.

A graph 140 indicates the similarity for each frame between the extracted time-series data 60 in which the class boundary B4 is detected and the reference time-series data 30 corresponding to the boundary type (C3, C4). Referring to the graph 140, the similarity for each frame is high in both the portion before the class boundary B4 and the portion after the class boundary B4. From this, it is considered that both the point that the portion before the class boundary B4 is the class C3 and the point that the portion after the class boundary B4 is the class C4 are highly reliable.

By analyzing the graph 130 and the graph 140 in this manner, it can be said that the probability of belonging to the class C3 is higher than the probability of belonging to the class C2 in the time-series data 20 between the class boundary B3 and the class boundary B4. Therefore, the correction unit 2120 corrects the boundary type of the class boundary B3 from (C1, C2) to (C1, C3).

In order to more specifically realize the processing described with reference to FIG. 16, for example, the correction unit 2120 performs the following processing on two adjacent class boundaries that are not consistent with each other. First, regarding the extracted time-series data 60 in which the preceding class boundary (B3 in FIG. 16) is detected and the reference time-series data 30 corresponding to the boundary type of the class boundary, the correction unit 2120 calculates a statistical value (for example, an average value) of the similarity of each frame of the portion before the class boundary and a statistical value of the similarity of each frame of the portion after the class boundary, and compares them. For example, in the example of FIG. 16, in the graph 130, the statistical value of the similarity calculated for the portion before the class boundary B3 is compared with the statistical value of the similarity calculated for the portion after the class boundary B3.

In a case where the difference between the calculated two statistical values is small (for example, in a case where a difference or a ratio between two statistical values falls within a predetermined numerical range), it is highly probable that the current class boundary is correct. Meanwhile, in a case where the difference between the two statistical values is large (for example, in a case where a difference or a ratio between two statistical values is out of a predetermined numerical range), it is highly probable that the current class boundary is wrong.

Similarly, for the extracted time-series data 60 in which the subsequent class boundary (B4 in FIG. 16) is detected and the reference time-series data 30 corresponding to the boundary type of the class boundary, the correction unit 2120 calculates the statistical value of the similarities of each frame of the portion before the class boundary and the statistical value of the similarities of each frame of the portion after the class boundary and compares them. For example, in the example of FIG. 16, in the graph 140, the statistical value of the similarity calculated for the portion before the class boundary B4 is compared with the statistical value of the similarity calculated for the portion after the class boundary B4. Similarly in this case, in a case where the difference between the calculated two statistical values is small, the probability that the current class boundary is correct is high. Meanwhile, in a case where the difference between the two statistical values is large, the probability that the current class boundary is incorrect is high.

By the above-described method, the correction unit 2120 determines which one of the preceding class boundary and the subsequent class boundary has an error. In a case where the difference in the statistical value of the similarity described above is large in the preceding class boundary, the correction unit 2120 determines that a class after the class boundary is an error in the preceding class boundary. Meanwhile, in a case where the difference in the statistical value of the similarity described above is large at the subsequent class boundary, the correction unit 2120 determines that a class before the class boundary is an error at the subsequent class boundary.

In the example of FIG. 16, the difference between the statistical value of the similarity calculated for the portion before the class boundary B3 and the statistical value of the similarity calculated for the portion after the class boundary B3 is large. Meanwhile, the difference between the statistical value of the similarity calculated for the portion before the class boundary B4 and the statistical value of the similarity calculated for the portion after the class boundary B4 is small. Therefore, the correction unit 2120 determines that there is an error in the class boundary B3.

The correction unit 2120 corrects the class in which the error is determined. For example, the correction unit 2120 corrects the class boundary determined as having an error so as to be consistent with the class boundary determined as having no error. In a case where it is determined that there is an error in the preceding class boundary and there is no error in the subsequent class boundary, the correction unit 2120 corrects the preceding class boundary to be consistent with the subsequent class boundary. More specifically, the correction unit 2120 changes the subsequent class (in the example of FIG. 16, C2 at the class boundary B3) indicated by the preceding class boundary to the preceding class (in the example of FIG. 16, C3 at the class boundary B4) indicated by the subsequent class boundary.

Meanwhile, in a case where it is determined that there is no error in the preceding class boundary and there is an error in the subsequent class boundary, the correction unit 2120 corrects the subsequent class boundary to be consistent with the preceding class boundary. More specifically, the correction unit 2120 changes the preceding class indicated by the subsequent class boundary to the subsequent class indicated by the preceding class boundary.

The method for correcting the class boundary is not limited to the above-described method. For example, the correction unit 2120 corrects the class boundary by the following method. First, a case where it is determined that there is an error in a preceding class boundary between two adjacent class boundaries will be described. For this case, for the time-series data belonging to each class, time-series data (for example, time-series data including head T frames) of a head portion thereof is prepared. For example, it is assumed that there are three types of classes C1, C2, and C3. In this case, three pieces of time-series data, that is, the time-series data of the head portion of the time-series data belonging to the class C1, the time-series data of the head portion of the time-series data belonging to the class C2, and the time-series data of the head portion of the time-series data belonging to the class C3, are prepared. These pieces of time-series data are referred to as second reference time-series data.

In a case where it is determined that there is an error in the preceding class boundary, the correction unit 2120 calculates the similarity with the second reference time-series data for the time-series data in the portion after the class boundary of the extracted time-series data 60 in which the class boundary is detected. Then, in a case where there is the second reference time-series data having high similarity (for example, the similarity is equal to or more than a threshold) to the time-series data after the class boundary in the extracted time-series data 60, the correction unit 2120 changes the subsequent class indicated by the class boundary to the class corresponding to the second reference time-series data. Here, the correction unit 2120 may acquire the second reference time-series data itself and calculate the feature value thereof, or may acquire the feature value of the second reference time-series data. In addition, it is assumed that the second reference time-series data is stored in advance in the storage device in association with the identification information of the corresponding class in a mode accessible from the class boundary detection apparatus 2000.

For example, in the case of the example of FIG. 16, it is determined that there is an error in the class boundary B3. Therefore, the correction unit 2120 calculates the similarity with the second reference time-series data of each class for the time-series data of the portion after the class boundary B3 in the extracted time-series data 60 in which the class boundary B3 is detected. As a result, it is assumed that it is determined that the similarity calculated for the second reference time-series data corresponding to the class C3 is high. In this case, the correction unit 2120 changes the subsequent class indicated by the class boundary B3 from C2 to C3.

Next, a case where it is determined that there is an error in a subsequent class boundary among adjacent class boundaries will be described. In this case, for the time-series data belonging to each class, the time-series data (for example, time-series data including the tail T frames) of the tail portion thereof is prepared. These pieces of time-series data are referred to as third reference time-series data.

In a case where it is determined that there is an error in the subsequent class boundary, the correction unit 2120 calculates the similarity with each of the third reference time-series data for the time-series data in the portion before the class boundary of the extracted time-series data 60 in which the class boundary is detected. Then, in a case where there is third reference time-series data having a high similarity (for example, the similarity is equal to or more than a threshold) to the time-series data before the class boundary in the extracted time-series data 60, the correction unit 2120 changes the preceding class indicated by the class boundary to the class corresponding to the third reference time-series data. Here, the correction unit 2120 may acquire the third reference time-series data itself and calculate the feature value thereof, or may acquire the feature value of the third reference time-series data. In addition, it is assumed that the third reference time-series data is stored in advance in the storage device in association with the identification information of the corresponding class in a mode accessible from the class boundary detection apparatus 2000.

The correction of the class boundary may be manually performed by the user of the class boundary detection apparatus 2000 instead of being automatically performed by the correction unit 2120 as described above. In this case, the correction unit 2120 provides the user with a screen for correcting the boundary type, and corrects the class boundary according to the result of the input operation of the user. Details will be described below.

Figure 17:
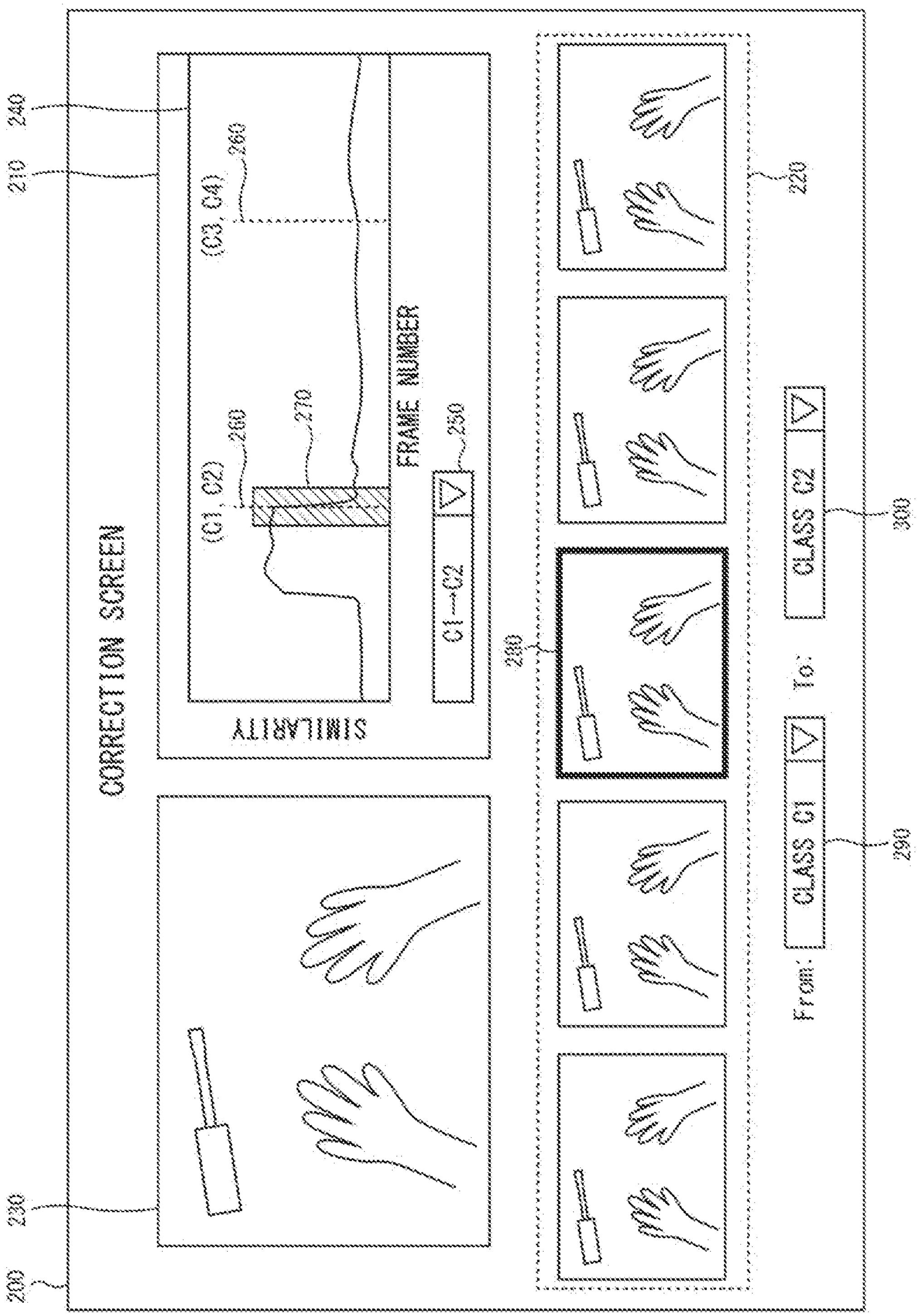
FIG. 17 is a diagram illustrating a correction screen for correcting a boundary type.

FIG. 17 is a diagram illustrating a correction screen for correcting the boundary type. The correction screen 200 includes display areas 210, 220, and 230. The display area 210 includes a graph 240 representing the magnitude of the similarity between the extracted time-series data 60 and the reference time-series data 30. In this graph, the reference time-series data 30 used for comparison with the extracted time-series data 60 can be selected in the input area 250. In FIG. 17, (C1, C2) is selected. The display area 210 further includes a boundary display 260 indicating the detected class boundary and a selection display 270 indicating the focused time-series data.

The display area 220 indicates a predetermined number (five in FIG. 17) of frames including the center of the time-series data displayed in the selection display 270. The mark 280 is a mark indicating a frame displayed in the display area 230. The display area 230 is an area in which the frame with the mark 280 is displayed. The user can perform an input operation to designate one of the frames displayed in the display area 220. Then, the mark 280 is attached to the frame designated by the input operation, and the frame is displayed in the display area 230.

The user can correct the class boundary using the correction screen 200. For example, in a case where the class boundary is included in the time-series data selected by the selection display 270, the user can correct the boundary type of the class boundary using the input area 290 and the input area 300. The input area 290 is used to correct the preceding class indicated by the class boundary. Meanwhile, the input area 300 is used for correcting the subsequent class indicated by the class boundary. For example, in the example of FIG. 17, the class boundary currently selected by the selection display 270 is (C1, C2). Therefore, C1 is displayed in the input area 290, and C2 is displayed in the input area 300. Here, in a case where the user selects C3 in the input area 290, the correction unit 2120 corrects the class boundary (C1, C2) to (C3, C2). Furthermore, in a case where the user selects C3 in the input area 300, the correction unit 2120 corrects the class boundary (C1, C2) to (C1, C3).

Here, the correction unit 2120 may determine a class boundary having an error by the method described above and present the correction screen 200 using the determination result. For example, the correction unit 2120 exemplifies the correction screen 200 in response to determination that there is inconsistency between adjacent class boundaries. At this time, the correction unit 2120 determines which one of the two adjacent class boundaries has an error by the method described above. Then, the correction unit 2120 generates the correction screen 200 focused on the class boundary identified as having the error (the selection display 270 is displayed). In this case, the graph 240 displays a graph indicating the similarity between the reference time-series data 30 corresponding to the boundary type of the class boundary determined as having an error and the extracted time-series data 60. As a result, the correction screen 200 focusing on the class boundary identified as having an error is provided to the user. Therefore, the user can easily correct the class boundary determined as having an error.

On the correction screen 200, an input operation of correcting the position of the class boundary may be possible. For example, in the graph 240, the user can change the position of the class boundary by moving the boundary display 260 to the left and right.

Although the present invention is described above with reference to the example embodiments, the present invention is not limited to the above-described example embodiments. Various changes that can be understood by those skilled in the art can be made to the configurations and details of the present invention within the scope of the present invention.

In the above-described example, the program includes a group of instructions (or software codes) for causing a computer to execute one or more functions described in the example embodiments when being read by the computer. The program may be stored in a non-transitory computer-readable medium or a tangible storage medium. As an example and not by way of limitation, the computer-readable medium or the tangible storage medium includes a random-access memory (RAM), a read-only memory (ROM), a flash memory, a solid-state drive (SSD) or any other memory technology, a CD-ROM, a digital versatile disc (DVD), a Blu-ray (registered trademark) disc or any other optical disk storage, a magnetic cassette, a magnetic tape, a magnetic disk storage, and any other magnetic storage device. The program may be transmitted on a transitory computer-readable medium or a communication medium. As an example and not by way of limitation, the transitory computer-readable medium or the communication medium includes electrical, optical, acoustic, or other forms of propagated signals.

Some or all of the above-described example embodiments can be described as in the following Supplementary Notes, but are not limited to the following Supplementary Notes.

(Supplementary Note 1)

A class boundary detection apparatus comprising:

an acquisition unit configured to acquire target time-series data that is time-series data to be analyzed:

a calculation unit configured to extract a plurality of pieces of extracted time-series data from the target time-series data and calculate a similarity between reference time-series data representing class boundaries of two different classes and each piece of the extracted time-series data; and a detection unit configured to detect a class boundary represented by the reference time-series data from the extracted time-series data having the calculated similarity equal to or more than a threshold, wherein the reference time-series data includes, after a tail portion of time-series data belonging to a preceding class indicated by the class boundary, a head portion of time-series data belonging to a subsequent class indicated by the class boundary.

(Supplementary Note 2)

The class boundary detection apparatus according to supplementary note 1, wherein the calculation unit calculates a similarity between a feature value of the reference time-series data and a feature value of the extracted time-series data as the similarity between the reference time-series data and the extracted time-series data.

(Supplementary Note 3)

The class boundary detection apparatus according to supplementary note 2, wherein the target time-series data is video data that is a sequence of video frames, the feature value of the extracted time-series data indicates a feature value of each frame constituting the extracted time-series data, and the calculation unit calculates, for each video frame constituting the extracted time-series data, a feature value that indicates an image feature of the video frame and data indicating a posture of a predetermined object included in the video frame.

(Supplementary Note 4)

The class boundary detection apparatus according to any one of supplementary notes 1 to 3, wherein the calculation unit calculates a similarity with each piece of the extracted time-series data for each piece of the reference time-series data corresponding to each of a plurality of types of class boundaries, and the detection unit detects, from the extracted time-series data in which the similarity with the reference time-series data is equal to or more than a threshold, a class boundary of a type corresponding to that reference time-series data.

(Supplementary Note 5)

The class boundary detection apparatus according to any one of supplementary notes 1 to 4, further comprising:

a verification unit configured to determine whether two class boundaries adjacent to each other detected from the target time-series data are consistent with each other; and a correction unit configured to correct a class boundary when it is determined that two class boundaries adjacent to each other are not consistent with each other.

(Supplementary Note 6)

The class boundary detection apparatus according to supplementary note 5, wherein, for each of the two class boundaries determined not to be consistent with each other, the correction unit compares degrees of similarity between frames in the extracted time-series data in which the class boundary is detected and the reference time-series data corresponding to a type of the class boundary between a portion before the class boundary and a portion after the class boundary, and determines that there is an error in the class boundary when a difference therebetween is equal to or more than a threshold.

(Supplementary Note 7)

The class boundary detection apparatus according to supplementary note 6, wherein the correction unit corrects the class boundary determined to have an error so as to be consistent with the class boundary determined to have no error.

(Supplementary Note 8)

The class boundary detection apparatus according to supplementary note 6, wherein for a similarity between frames in the extracted time-series data in which the class boundary determined to have an error is detected and the reference time-series data corresponding to a type of the class boundary, when a similarity calculated for a portion before the class boundary is lower than a similarity calculated for a portion after the class boundary, the correction unit calculates a similarity between the extracted time-series data and a tail portion of the time-series data belonging to each class and corrects a preceding class indicated by the class boundary determined to have an error in a class in which the similarity is equal to or more than a threshold, and for the similarity between frames in the extracted time-series data in which the class boundary determined to have an error is detected and the reference time-series data corresponding to the type of the class boundary, when a similarity calculated for a portion after the class boundary is lower than a similarity calculated for a portion before the class boundary, the correction unit calculates the similarity between the extracted time-series data and a head portion of the time-series data belonging to each class and corrects a subsequent class indicated by the class boundary determined to have an error in a class in which the similarity is equal to or more than a threshold.

(Supplementary Note 9)

The class boundary detection apparatus according to supplementary note 5, wherein the correction unit outputs a correction screen configured to receive an input operation for correcting a preceding class, a subsequent class, or both indicated by a class boundary, and corrects the class boundary according to an input operation performed on the correction screen.

(Supplementary Note 10)

A control method executed by a computer, the control method comprising:

an acquisition step of acquiring target time-series data that is time-series data to be analyzed;

a calculation step of extracting a plurality of pieces of extracted time-series data from the target time-series data and calculating a similarity between reference time-series data representing class boundaries of two different classes and each piece of the extracted time-series data; and a detection step of detecting a class boundary represented by the reference time-series data from the extracted time-series data having the calculated similarity equal to or more than a threshold, wherein the reference time-series data includes, after a tail portion of time-series data belonging to a preceding class indicated by the class boundary, a head portion of time-series data belonging to a subsequent class indicated by the class boundary.

(Supplementary Note 11)

The control method according to supplementary note 10, wherein, in the calculation step, calculating a similarity between a feature value of the reference time-series data and a feature value of the extracted time-series data as the similarity between the reference time-series data and the extracted time-series data.

(Supplementary Note 12)

The control method according to supplementary note 11, wherein the target time-series data is video data that is a sequence of video frames, the feature value of the extracted time-series data indicates a feature value of each frame constituting the extracted time-series data, and in the calculation step, calculating, for each video frame constituting the extracted time-series data, a feature value that indicates an image feature of the video frame and data indicating a posture of a predetermined object included in the video frame is calculated.

(Supplementary Note 13)

The control method according to any one of supplementary notes 10 to 12, wherein in the calculation step, calculating a similarity with each piece of the extracted time-series data for each piece of the reference time-series data corresponding to each of a plurality of types of class boundaries, and in the detection step, detecting, from the extracted time-series data in which the similarity with the reference time-series data is equal to or more than a threshold, a class boundary of a type corresponding to the reference time-series data.

(Supplementary Note 14)

The control method according to any one of supplementary notes 10 to 13, further comprising:

a verification step of determining whether two class boundaries adjacent to each other detected from the target time-series data are consistent with each other; and a correction step of correcting a class boundary when it is determined that two class boundaries adjacent to each other are not consistent with each other.

(Supplementary Note 15)

The control method according to supplementary note 14, wherein, in the correction step, for each of the two class boundaries determined not to be consistent with each other, comparing degrees of similarity between frames in the extracted time-series data in which the class boundary is detected and the reference time-series data corresponding to a type of the class boundary between a portion before the class boundary and a portion after the class boundary, and determining that there is an error in the class boundary when the difference is equal to or larger than a threshold.

(Supplementary Note 16)

The control method according to supplementary note 15, wherein, in the correction step, correcting the class boundary determined to have an error to be consistent with the class boundary determined to have no error.

(Supplementary Note 17)

The control method according to supplementary note 15, wherein in the correction step, for a similarity between frames in the extracted time-series data in which the class boundary determined to have an error is detected and the reference time-series data corresponding to a type of the class boundary, when a similarity calculated for a portion before the class boundary is lower than a similarity calculated for a portion after the class boundary, calculating a similarity between the extracted time-series data and a tail portion of the time-series data belonging to each class and correcting a preceding class indicated by the class boundary determined to have an error in a class in which the similarity is equal to or more than a threshold, and for the similarity between frames in the extracted time-series data in which the class boundary determined to have an error is detected and the reference time-series data corresponding to the type of the class boundary, when a similarity calculated for a portion after the class boundary is lower than a similarity calculated for a portion before the class boundary, calculating the similarity between the extracted time-series data and a head portion of the time-series data belonging to each class and correcting a subsequent class indicated by the class boundary determined to have an error in a class in which the similarity is equal to or more than a threshold.

(Supplementary Note 18)

The control method according to supplementary note 14, wherein, in the correction step, outputting a correction screen configured to receive an input operation for correcting a preceding class, a subsequent class, or both indicated by a class boundary, and correcting the class boundary according to an input operation performed on the correction screen.

(Supplementary Note 19)

A non-transitory computer-readable medium storing a program that causes a computer to execute:

an acquisition step of acquiring target time-series data that is time-series data to be analyzed;

a calculation step of extracting a plurality of pieces of extracted time-series data from the target time-series data and calculating a similarity between reference time-series data representing class boundaries of two different classes and each piece of the extracted time-series data; and a detection step of detecting a class boundary represented by the reference time-series data from the extracted time-series data having the calculated similarity equal to or more than a threshold, wherein the reference time-series data includes, after a tail portion of time-series data belonging to a preceding class indicated by the class boundary, a head portion of time-series data belonging to a subsequent class indicated by the class boundary.

(Supplementary Note 20)

The computer-readable medium according to supplementary note 19, wherein, in the calculation step, calculating a similarity between a feature value of the reference time-series data and a feature value of the extracted time-series data as the similarity between the reference time-series data and the extracted time-series data.

(Supplementary Note 21)

The computer-readable medium according to supplementary note 20, wherein the target time-series data is video data that is a sequence of video frames, the feature value of the extracted time-series data indicates a feature value of each frame constituting the extracted time-series data, and in the calculation step, calculating, for each video frame constituting the extracted time-series data, a feature value that indicates an image feature of the video frame and data indicating a posture of a predetermined object included in the video frame is calculated.

(Supplementary Note 22)

The computer-readable medium according to any one of supplementary notes 19 to 21, wherein in the calculation step, calculating a similarity with each piece of the extracted time-series data for each piece of the reference time-series data corresponding to each of a plurality of types of class boundaries, and in the detection step, detecting, from the extracted time-series data in which the similarity with the reference time-series data is equal to or more than a threshold, a class boundary of a type corresponding to the reference time-series data.

(Supplementary Note 23)

The computer-readable medium according to any one of supplementary notes 19 to 22, wherein the program causes the computer further to execute:

a verification step of determining whether two class boundaries adjacent to each other detected from the target time-series data are consistent with each other; and a correction step of correcting a class boundary when it is determined that two class boundaries adjacent to each other are not consistent with each other.

(Supplementary Note 24)

The computer-readable medium according to supplementary note 23, wherein, in the correction step, for each of the two class boundaries determined not to be consistent with each other, comparing degrees of similarity between frames in the extracted time-series data in which the class boundary is detected and the reference time-series data corresponding to a type of the class boundary between a portion before the class boundary and a portion after the class boundary, and determining that there is an error in the class boundary when the difference is equal to or larger than a threshold.

(Supplementary Note 25)

The computer readable medium according to supplementary note 24, wherein, in the correction step, correcting the class boundary determined to have an error to be consistent with a class boundary determined to have no error.

(Supplementary Note 26)

The computer-readable medium according to supplementary note 24, wherein in the correction step, for a similarity between frames in the extracted time-series data in which the class boundary determined to have an error is detected and the reference time-series data corresponding to a type of the class boundary, when a similarity calculated for a portion before the class boundary is lower than a similarity calculated for a portion after the class boundary, calculating a similarity between the extracted time-series data and a tail portion of the time-series data belonging to each class and correcting a preceding class indicated by the class boundary determined to have an error in a class in which the similarity is equal to or more than a threshold, and for the similarity between frames in the extracted time-series data in which the class boundary determined to have an error is detected and the reference time-series data corresponding to the type of the class boundary, when a similarity calculated for a portion after the class boundary is lower than a similarity calculated for a portion before the class boundary, calculating the similarity between the extracted time-series data and a head portion of the time-series data belonging to each class and correcting a subsequent class indicated by the class boundary determined to have an error in a class in which the similarity is equal to or more than a threshold.

(Supplementary Note 27)

The computer-readable medium according to supplementary note 23, wherein, in the correction step, outputting a correction screen configured to receive an input operation for correcting a preceding class, a subsequent class, or both indicated by a class boundary, and correcting the class boundary according to an input operation performed on the correction screen.

REFERENCE SIGNS LIST

10 TARGET TIME-SERIES DATA
20 TIME-SERIES DATA
30 REFERENCE TIME-SERIES DATA
40 TIME-SERIES DATA
50 TIME-SERIES DATA
60 EXTRACTED TIME-SERIES DATA
80 BOUNDARY TYPE IDENTIFICATION INFORMATION
90 REFERENCE DATA
100 TABLE
110 TABLE
112 BOUNDARY TYPE IDENTIFICATION INFORMATION
114 BOUNDARY POSITION
130 GRAPH
140 GRAPH
200 CORRECTION SCREEN
210 DISPLAY AREA
220 DISPLAY AREA
230 DISPLAY AREA
240 GRAPH
250 INPUT AREA
260 BOUNDARY DISPLAY
270 SELECTION DISPLAY
280 MARK
290 INPUT AREA
300 INPUT AREA
500 COMPUTER
502 BUS
504 PROCESSOR
506 MEMORY
508 STORAGE DEVICE
510 INPUT/OUTPUT INTERFACE
512 NETWORK INTERFACE
2000 CLASS BOUNDARY DETECTION APPARATUS
2020 ACQUISITION UNIT
2040 CALCULATION UNIT
2060 DETECTION UNIT
2080 OUTPUT UNIT
2100 VERIFICATION UNIT
2120 CORRECTION UNIT

What is claimed is:

1. A class boundary detection apparatus comprising:

at least one memory that is configured to store instructions; and at least one processor that is configured to execute the instructions to:

acquire target time-series data that is time-series data to be analyzed;

extract a plurality of pieces of extracted time-series data from the target time-series data and calculate a similarity between reference time-series data representing class boundaries of two different classes and each piece of the extracted time-series data; and detect a class boundary represented by the reference time-series data from the extracted time-series data having the calculated similarity equal to or more than a threshold, wherein the reference time-series data includes, after a tail portion of time-series data belonging to a preceding class indicated by the class boundary, a head portion of time-series data belonging to a subsequent class indicated by the class boundary, wherein the at least one processor is configured to execute the instructions further to:

determine whether two class boundaries adjacent to each other detected from the target time-series data are consistent with each other; and correct a class boundary when it is determined that two class boundaries adjacent to each other are not consistent with each other, wherein the correction of the class boundary further includes, for each of the two class boundaries determined not to be consistent with each other, comparing degrees of similarity between frames in the extracted time-series data in which the class boundary is detected and the reference time-series data corresponding to a type of the class boundary between a portion before the class boundary and a portion after the class boundary, and determining that there is an error in the class boundary when a difference therebetween is equal to or more than a threshold, and wherein the correction of the class boundary further includes correcting the class boundary determined to have an error so as to be consistent with the class boundary determined to have no error.

2. The class boundary detection apparatus according to claim 1, wherein the calculation of the similarity includes calculating a similarity between a feature value of the reference time-series data and a feature value of the extracted time-series data as the similarity between the reference time-series data and the extracted time-series data.

3. The class boundary detection apparatus according to claim 2, wherein the target time-series data is video data that is a sequence of video frames, the feature value of the extracted time-series data indicates a feature value of each frame constituting the extracted time-series data, and the calculation of the similarity further includes calculating, for each video frame constituting the extracted time-series data, a feature value that indicates an image feature of the video frame and data indicating a posture of a predetermined object included in the video frame.

4. The class boundary detection apparatus according to claim 1, wherein the calculation of the similarity further includes calculating a similarity with each piece of the extracted time-series data for each piece of the reference time-series data corresponding to each of a plurality of types of class boundaries, and the detection of the class boundary further includes detecting, from the extracted time-series data in which the similarity with the reference time-series data is equal to or more than a threshold, a class boundary of a type corresponding to that reference time-series data.

5. The class boundary detection apparatus according to claim 1, wherein the correction of the class boundary further includes:

for a similarity between frames in the extracted time-series data in which the class boundary determined to have an error is detected and the reference time-series data corresponding to a type of the class boundary, when a similarity calculated for a portion before the class boundary is lower than a similarity calculated for a portion after the class boundary, calculating a similarity between the extracted time-series data and a tail portion of the time-series data belonging to each class and corrects a preceding class indicated by the class boundary determined to have an error in a class in which the similarity is equal to or more than a threshold; and for the similarity between frames in the extracted time-series data in which the class boundary determined to have an error is detected and the reference time-series data corresponding to the type of the class boundary, when a similarity calculated for a portion after the class boundary is lower than a similarity calculated for a portion before the class boundary, calculating the similarity between the extracted time-series data and a head portion of the time-series data belonging to each class and corrects a subsequent class indicated by the class boundary determined to have an error in a class in which the similarity is equal to or more than a threshold.

6. The class boundary detection apparatus according to claim 1, wherein the correction of the class boundary further includes outputting a correction screen configured to receive an input operation for correcting a preceding class, a subsequent class, or both indicated by a class boundary, and correcting the class boundary according to an input operation performed on the correction screen.

7. A control method executed by a computer, the control method comprising:

acquiring target time-series data that is time-series data to be analyzed;

extracting a plurality of pieces of extracted time-series data from the target time-series data and calculating a similarity between reference time-series data representing class boundaries of two different classes and each piece of the extracted time-series data; and detecting a class boundary represented by the reference time-series data from the extracted time-series data having the calculated similarity equal to or more than a threshold, wherein the reference time-series data includes, after a tail portion of time-series data belonging to a preceding class indicated by the class boundary, a head portion of time-series data belonging to a subsequent class indicated by the class boundary, wherein the control method further comprises:

determining whether two class boundaries adjacent to each other detected from the target time-series data are consistent with each other; and correcting a class boundary when it is determined that two class boundaries adjacent to each other are not consistent with each other, wherein the correction of the class boundary further includes, for each of the two class boundaries determined not to be consistent with each other, comparing degrees of similarity between frames in the extracted time-series data in which the class boundary is detected and the reference time-series data corresponding to a type of the class boundary between a portion before the class boundary and a portion after the class boundary, and determining that there is an error in the class boundary when a difference therebetween is equal to or more than a threshold, and wherein the correction of the class boundary further includes correcting the class boundary determined to have an error so as to be consistent with the class boundary determined to have no error.

8. The control method according to claim 7, wherein the calculation of the similarity includes calculating a similarity between a feature value of the reference time-series data and a feature value of the extracted time-series data as the similarity between the reference time-series data and the extracted time-series data.

9. The control method according to claim 8, wherein the target time-series data is video data that is a sequence of video frames, the feature value of the extracted time-series data indicates a feature value of each frame constituting the extracted time-series data, and the calculation of the similarity further includes calculating, for each video frame constituting the extracted time-series data, a feature value that indicates an image feature of the video frame and data indicating a posture of a predetermined object included in the video frame is calculated.

10. The control method according to claim 7, wherein the calculation of the similarity further includes calculating a similarity with each piece of the extracted time-series data for each piece of the reference time-series data corresponding to each of a plurality of types of class boundaries, and the detection of the class boundary further includes detecting, from the extracted time-series data in which the similarity with the reference time-series data is equal to or more than a threshold, a class boundary of a type corresponding to the reference time-series data.

11. A non-transitory computer-readable medium storing a program that causes a computer to execute:

acquiring target time-series data that is time-series data to be analyzed;

extracting a plurality of pieces of extracted time-series data from the target time-series data and calculating a similarity between reference time-series data representing class boundaries of two different classes and each piece of the extracted time-series data; and detecting a class boundary represented by the reference time-series data from the extracted time-series data having the calculated similarity equal to or more than a threshold, wherein the reference time-series data includes, after a tail portion of time-series data belonging to a preceding class indicated by the class boundary, a head portion of time-series data belonging to a subsequent class indicated by the class boundary, wherein the program causes the computer further to execute:

determining whether two class boundaries adjacent to each other detected from the target time-series data are consistent with each other; and correcting a class boundary when it is determined that two class boundaries adjacent to each other are not consistent with each other, wherein the correction of the class boundary further includes, for each of the two class boundaries determined not to be consistent with each other, comparing degrees of similarity between frames in the extracted time-series data in which the class boundary is detected and the reference time-series data corresponding to a type of the class boundary between a portion before the class boundary and a portion after the class boundary, and determining that there is an error in the class boundary when a difference therebetween is equal to or more than a threshold, and wherein the correction of the class boundary further includes correcting the class boundary determined to have an error so as to be consistent with the class boundary determined to have no error.

12. The computer-readable medium according to claim 11, wherein the calculation of the similarity includes calculating a similarity between a feature value of the reference time-series data and a feature value of the extracted time-series data as the similarity between the reference time-series data and the extracted time-series data.

13. The computer-readable medium according to claim 12, wherein the target time-series data is video data that is a sequence of video frames, the feature value of the extracted time-series data indicates a feature value of each frame constituting the extracted time-series data, and the calculation of the similarity further includes calculating, for each video frame constituting the extracted time-series data, a feature value that indicates an image feature of the video frame and data indicating a posture of a predetermined object included in the video frame is calculated.

14. The computer-readable medium according to claim 11, wherein the calculation of the similarity further includes calculating a similarity with each piece of the extracted time-series data for each piece of the reference time-series data corresponding to each of a plurality of types of class boundaries, and the detection of the class boundary further includes detecting, from the extracted time-series data in which the similarity with the reference time-series data is equal to or more than a threshold, a class boundary of a type corresponding to the reference time-series data.

* * * * *